US012777211B2

(12) United States Patent
Hyde et al.

(10) Patent No.: US 12,777,211 B2
(45) Date of Patent: *Oct. 27, 2026

(54) SYSTEM AND METHOD FOR SYNCHRONIZING LIVE VIDEO WITH EXTERNAL DATA SOURCES

(71) Applicant: Disney Enterprises, Inc., Burbank, CA (US)

(72) Inventors: Andrew Hyde, Burbank, CA (US); Geoffrey Booth, Burbank, CA (US); Sujal Shah, Burbank, CA (US); Jonathan Flanders, Burbank, CA (US); Ognjen Boras, Burbank, CA (US); Aaron LaBerge, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/961,612

(22) Filed: Nov. 27, 2024

(65) Prior Publication Data

US 2025/0088685 A1 Mar. 13, 2025

Related U.S. Application Data

(63) Continuation of application No. 18/067,804, filed on Dec. 19, 2022, now Pat. No. 12,184,914.

(51) Int. Cl.

| | |
|---|---|
| ***H04N 21/242*** | (2011.01) |
| ***H04L 65/75*** | (2022.01) |
| ***H04N 21/262*** | (2011.01) |
| ***H04N 21/43*** | (2011.01) |

(52) U.S. Cl.

CPC ........... *H04N 21/242* (2013.01); *H04L 65/75* (2022.05); *H04N 21/26258* (2013.01); *H04N 21/4305* (2013.01)

(58) Field of Classification Search

CPC ........... H04N 21/242; H04N 21/26258; H04N 21/4305; H04L 65/75

See application file for complete search history.

(56) References Cited

U.S. PATENT DOCUMENTS

| | | | | |
|---|---|---|---|---|
| 9,654,758 | B2 * | 5/2017 | Stelmack | H04N 21/8547 |
| 10,979,477 | B1 * | 4/2021 | Cabrido | H04L 65/611 |
| 2018/0309827 | A1 * | 10/2018 | Birrer | H04L 67/1095 |
| 2019/0068665 | A1 * | 2/2019 | Kieft | H04L 67/75 |

(Continued)

*Primary Examiner* — Yassin Alata

(74) *Attorney, Agent, or Firm* — McCormick, Paulding & Huber PLLC

(57) ABSTRACT

Methods and systems for synchronizing video with external data sources by a user device where the video is grouped into segment video files having video frames, includes establishing a persistent connection between the user device and a synchronization server, receiving a sync message associated with the beginning of a video segment to be played by the user device, the sync message having an initial recording wall clock time stamp, calculating by the user device a recording wall clock time for each frame in the segment using the initial wall clock time and a frame rate, downloading the video segment file for playing on the user device, receiving by the user device, external data having a wall clock time stamp, and displaying on the user device the external data having the same time stamp as the recording time stamp of the video frame being displayed.

38 Claims, 16 Drawing Sheets

(56) References Cited

U.S. PATENT DOCUMENTS

2021/0195263 A1* 6/2021 Garcia Sanchez ........................... H04N 21/44204
2022/0150385 A1* 5/2022 Hashimoto .......... H04N 5/0675

* cited by examiner

460

Fig. 4C

External Data Cache & Logic Table

| | Time stamp (XX:XX:XX.XXX) | External data source name/ identifier | Data Label | Segment ID | Frame Index | Ext. Data Content Received | Ext. Data Logic/Actions |
|---|---|---|---|---|---|---|---|
| | . . . | . . . | . . . | . . . | . . . | . . . | . . . |
| 488 | 12:34:56.000 | Game Data | GD Event 1 | | | Player 22 hit a home run | Display in real-time game data section of sports host app |
| 488 | 12:34:56.000 | Video Data | VD Event 1 | 1234 | 1 | Updated score is displayed | Display in real-time game data section of sports host app |
| 490 | 12:34:56.016 | Other Related Data | ORD Event 1 | | | Fantasy: "Your fantasy team score increased 10 points" | Display alert in pop-up window on user's screen |
| 492 | 12:34:56.966 | Game Data | GD Event 2 | | | Player 34 stole home | Display in real-time game data section of sports host app |
| 492 | 12:34:56.966 | Other Related Data | ORD Event 2 | | | Betting: "You just won your 3-way parlay bet" | Display alert in pop-up window on user's screen |
| 494 | 12:34:56.983 | Video Data | VD Event 2 | 1234 | 60 | Return from commercial | Display Sports Co. logo on bottom right of video screen |
| 496 | 12:34:57.016 | Game Data | GD Event 3 | | | Player 55 dropped a fly ball causing run to score | Display in real-time game data section of sports host app |
| | . . . | . . . | . . . | . . . | . . . | . . . | . . . |

Sync Message Add/Remove Logic

Sync Message Generation Logic

SYSTEM AND METHOD FOR SYNCHRONIZING LIVE VIDEO WITH EXTERNAL DATA SOURCES

CROSS REFERENCE TO RELATED APPLICATIONS

This application is a continuation of U.S. patent application Ser. No. 18/067,804, filed on Dec. 19, 2022, the content of which is hereby incorporated by reference in its entirety.

BACKGROUND

It is common practice for computer-based servers to digitally stream media content (e.g., video, music, text, graphics, and the like), live or on-demand, to electronic devices, such as mobile smartphones, tablets and the like, for viewing by a user. Such media content is often provided to the user devices (or clients) via the internet using a distributed network of computer-based data file servers deployed in one or more data centers, also referred to as a content delivery network or content distribution network (collectively, CDN).

HTTP-based streaming methods, such as HLS (HTTP-based Live Media Streaming communication protocol), supported or implemented by products made by companies such as Apple, Inc., HDS (HTTP Dynamic Streaming), supported or implemented by products made by companies such as Adobe, Inc., and DASH (Dynamic Adaptive bit-rate Streaming over HTTP) or MPEG-DASH, are commonly used for streaming media content and operate using "HTTP-based streaming," where media content is stored in "segments" or "chunks" of a predetermined length (e.g., 1 to 10 seconds) and a playlist (or manifest or index) file is provided that lists, or points to, each of the segments or chunks of the media stream for display or playback purposes by the user devices.

HLS typically works by generating a manifest file which is continually polled by the video player and contains the location (or address or URL) where the segments of video should be downloaded from. Within each segment are multiple frames, which are displayed on the user device by the video player (or player app). Typically, the manifest dictates how long each segment will be, e.g., two seconds. Also, when a streaming live event is being watched on a device, it is typically delayed by about 20 to 40 seconds behind the live events happening at the live video source, e.g., baseball game stadium. However, external data sources, such as text-based data from various data vendors at the stadium may post on-line or provide data about the live game within a few seconds of an event occurring. This creates a risk of a "spoiler" effect by allowing a user to know what event happened live before the video has actually shown it on the user's device.

Accordingly, it would be desirable to have a system or method that improves the shortcomings of existing live video streaming techniques that also have associated external data sources to avoid the risk of spoilers effects and provide a better live viewing experience for the user.

BRIEF DESCRIPTION OF THE DRAWINGS

FIG. 4C shows an external data cache & logic table showing the external data sources, data received and logic or actions to take based on the data, in accordance with embodiments of the present disclosure.

DETAILED DESCRIPTION

As discussed in more detail below, the present disclosure is directed to methods and systems for synchronizing live video with external data sources. In particular, the present disclosure delays the displaying of video-related external data until the video being played catches up with the data to be displayed. It allows each user to view data that is synchronized in realtime with the video being viewed by that user, thereby avoiding advance-notice of events or spoilers.

For example, in a sports app for a baseball game that provides a realtime game data screen showing realtime balls and strikes and game events or action, the realtime game data screen would not be updated until the video corresponding to that game data is being shown, thereby providing synchronization (or simultaneous display) of realtime game data and realtime video playing. This allows a sports app (or other event tracking app) to show both streaming video of an event and realtime video-related data on the same screen without having the realtime data spoil the user's enjoyment of watching the game.

It also provides the ability to insert auxiliary or additional general or personalized client-specific content on the screen with the original video that are synchronized to the video being played, e.g., relating to a user's preferences or activities, such as alerts or messages to a user for teams or players of interest to that user, or for fantasy sports effects for that user, or for on-line wagering results for that user, or the like.

It also can be used to prevent comments on social media, such as Twitter®, Facebook®, Instagram®, Snapchat®, or the like, from being shown on the user's device screen until the streaming video shows the event being commented on.

Also, the present disclosure may be used with any live streaming event where it is desired not to have advance notice or spoilers, such as sporting events, game shows, contest events, awards shows, talent shows, dating shows, reality shows, and the like, where the show is streamed live, e.g., a sports game or a show where results are released live. It may also be used where results (or major events in the show) are pre-recorded and kept secret until the show is broadcast or digitally streamed to a mass audience for the first time. In that case, the present disclosure may prevent comments on social media such as Twitter®, Facebook®, Instagram®, Snapchat®, or the like, or other video-related data feeds indicating results that may arrive faster than the video being played, from being shown on the user's device screen until the streaming video shows the event. For example, in a reality TV show where a person gets voted off the show, this may be a major event on which people would comment on social media as soon as they see it, which would spoil it for others viewing the show who are viewing it on their device a few seconds or minutes behind.

Figure 1:
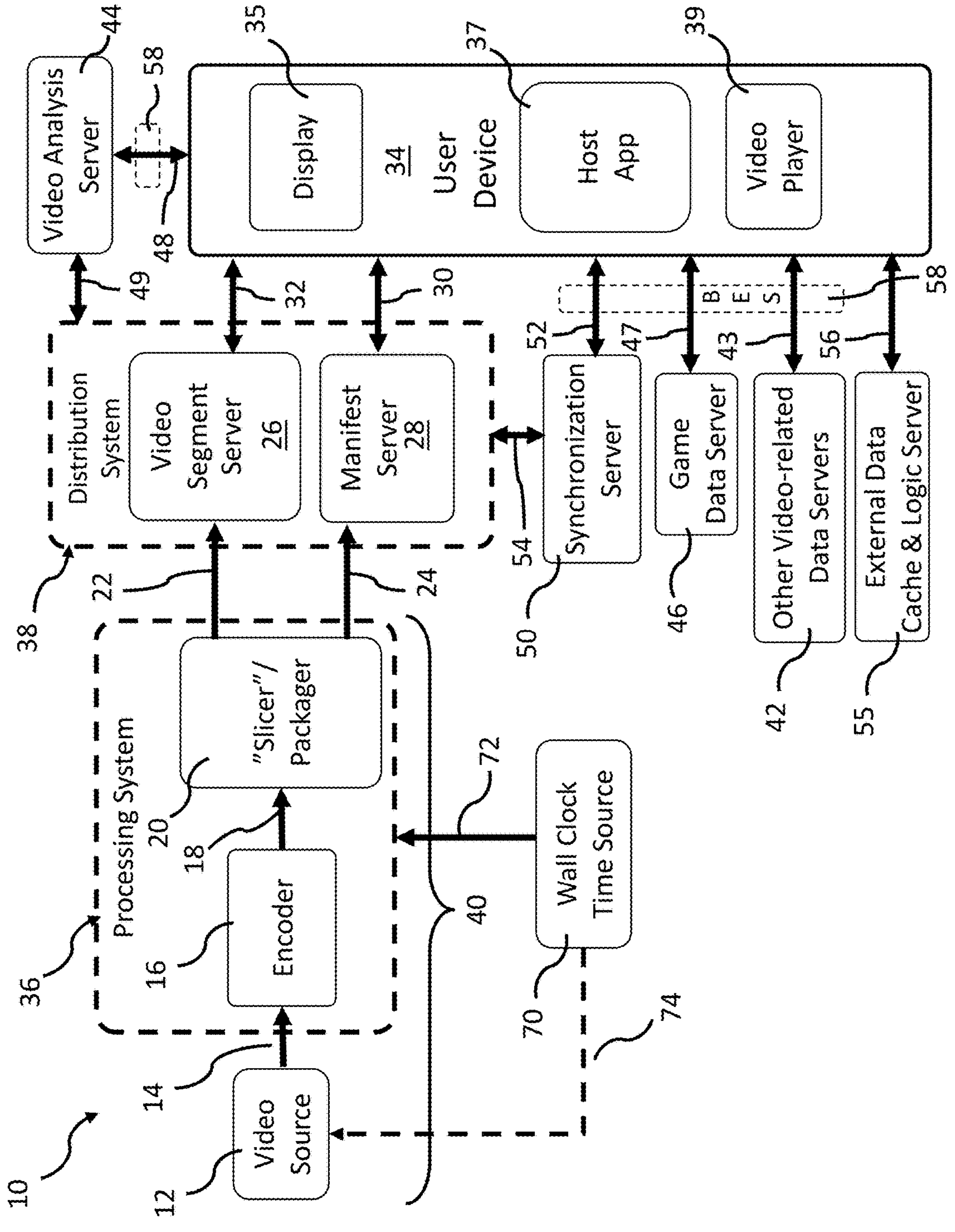
FIG. 1 is a block diagram of components of a system for synchronizing video with external data sources, in accordance with embodiments of the present disclosure.

FIG. 1 illustrates various components (or devices or logic) of a client-server based digital media streaming system 10, which includes a video source 12, which provides source video (or other media) data or signal for distribution to one or more client devices 34 as discussed herein. The video source 12 may include, for example, one or more video cameras, video players, production or master control centers/rooms, playback servers, video routers and the like which are capturing a live streaming event. Although a single video source 12 is shown, a plurality of different video sources may be used if desired in some embodiments of the present disclosure. The live video stream signal or data provided by the video source 12 may be an analog signal, such as that shown by a line 201 on a graph 200 (FIG. 2).

Figure 2A:
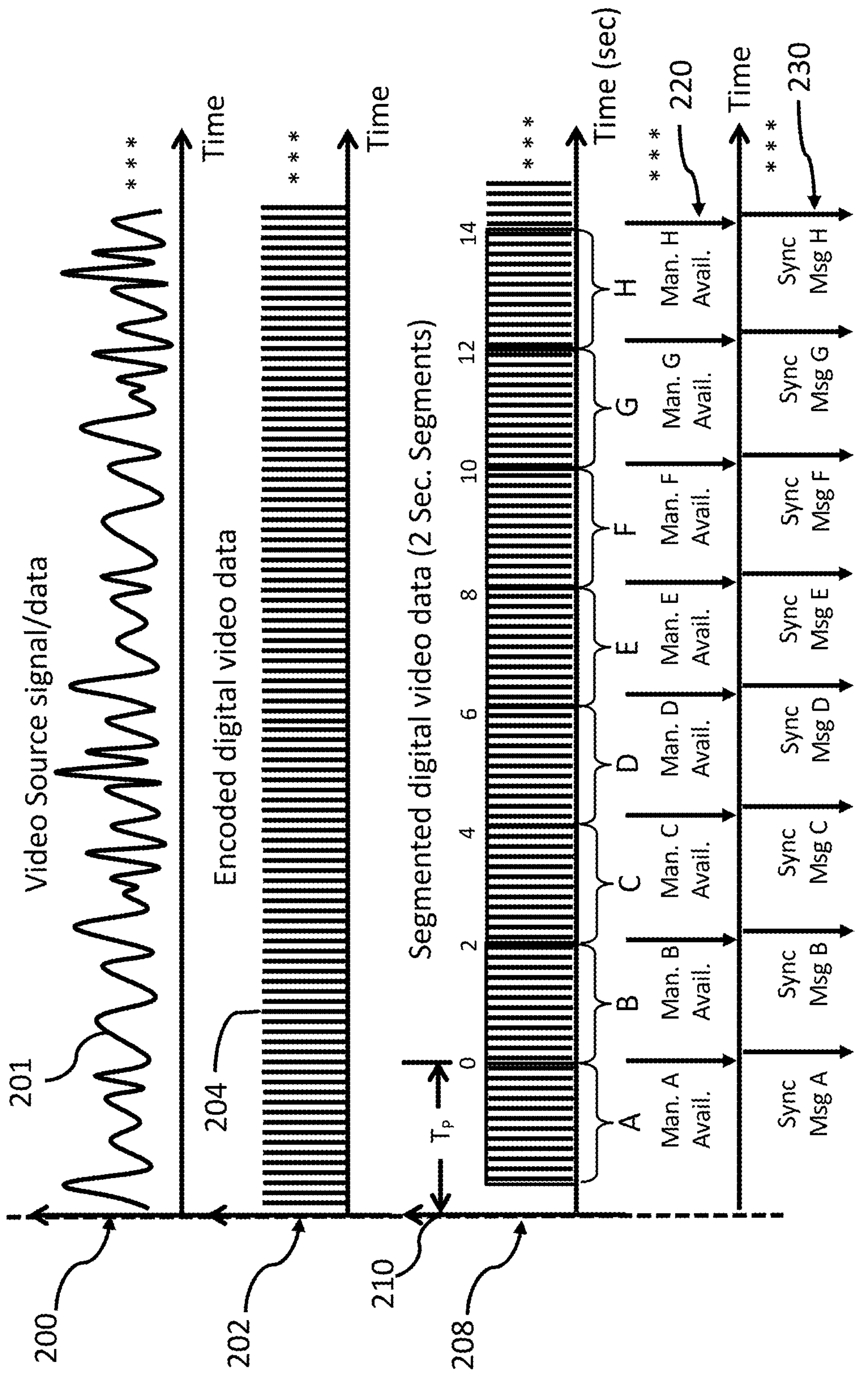
FIG. 2A is a series of graphs showing generalized data formats and timing for video encoding, manifests, and synchronization (or Sync) messages, in accordance with embodiments of the present disclosure.

Referring to FIG. 1 and FIG. 2A, live video stream data 200 (FIG. 2A) from the video source 12 (FIG. 1) is provided on a line 14 to an encoder 16, which converts the live video stream source signal 201 to a digitized or encoded digital stream of data indicative of the video source signal 201. An example of the encoded video signal is shown on a graph 202, where each vertical line 204 represents digital data sample indicative of the video source signal 200 at the time it was digitally sampled, and the time spacing between the lines 204 is indicative of the rate at which the encoder samples the source signal (encoder sample rate) to convert it into digital data. The number of digital bits or pixels in each digital data sample may be indicative of the resolution of sample of the video source signal. The encoder 16 may be any encoder that receives a real-time or other input signal from one or more audio-video devices and encodes the stream and formats it for delivery. The encoder 16 may provide one or more versions of the encoded digital video data, if desired, e.g., a given input stream may produce a plurality of different sample rates, resolutions, qualities, or variants, of the digital video data stream, which may permit "adaptive bit rate" streaming, discussed more hereinafter.

The encoder 16 (FIG. 1) provides the encoded digital data stream 204 (FIG. 2A) on a line 18 to a packager (or slicer or segmenter or chunker) 20, which reads the encoded digital data stream 204 (FIG. 2A) and divides (or packages or slices) it into a series of smaller segments or "chunks" of video data, each having substantially equal duration (e.g., 1 to 10 seconds each), and provides the video segments on a line 22 (FIG. 1) as video files to a video (or media) segment (or chunk) server 26, where they are stored for use by the client/user devices 34. The segment server 26 may be a plurality or network of servers or a CDN (discussed herein above), wherein one or more servers may be referred to as an "origin" server. The video data segments, or chunks, are illustrated as letters A-H on a graph 208 in FIG. 2A, each of which may be a separate data file A-H. There also may be a small time delay, e.g., about 500 milliseconds, between the beginning of the encoded digital video data 204 and the beginning of the first segment (or chunk) video data file A, due to processing time of the slicer/packager 20 (FIG. 1) and transfer time of the network to transfer the video segment data file to the video segment server 26.

In addition, the Encoder 16 or the Slicer/Packager 20 may receive a "wall clock" time on a line 72 from a wall clock time source 70, indicative of the time at the event venue (or the time when the video reaches the encoder/slicer/packager), as discussed herein. The wall clock time is inserted into the video segment file at the beginning of each video segment into a standard time stamp data format, which may include the date and time, as discussed herein. The wall clock time stamp may be used herein by the client to determine the starting time stamp of each video segment, as discussed hereinafter. In some embodiments, the wall clock time may be provided to or received by the video source at the event, as shown by a dashed line 74 and embedded in the video signal sent on the line 14 to the encoder 16. As used in this disclosure, "wall clock" refers to a reference time source that serves as an authoritative time reference for the creation of time stamps for the purpose of synchronization in the system of the present disclosure, as discussed herein. The "wall clock" may be, for example, a clock provided at an event venue to drive a wall display showing a time treated as accurate within the venue (e.g., a stadium). Alternatively, the "wall clock" may be the time source used to synchronize a broadcast of an event with other programming from the broadcaster. The wall clock may be calibrated or set by a satellite signal or other authoritative time source, or may be simply an agreed upon arbitrary clock that can be used to generate time stamps for both a data feed and a streaming broadcast.

After a given video segment (or chunk) file A-H (FIG. 2A) has been stored on the video segment (or chunk) server 26 (FIG. 1), the packager 20 provides a manifest or playlist or index file (or updated version of same) on a line 24 to a manifest server 28, which includes the pointer, or location, or address, such as a URL (universal resource locator) or other network or server location identifier, and characteristics or metadata about the video segment file, e.g., file name, resolution, segment length/duration, segment sequence number, serial number, size, bit rate, sample rate, bandwidth, quality, digital rights management controls, sample rate, time stamp, and the like, of the associated video segment file (discussed more herein). In addition, after the manifest file is updated on the manifest server 28, it is available for reading by the client/user device, as indicated by the lines 220 in FIG. 2A.

Referring to FIG. 1 and FIG. 2A, a synchronization server 50 may communicate with the distribution system 38 on a line 54, including the video segment server 26 and the manifest server 28, and provide Sync Messages on a line 52 to the client user devices 34, which communicates with the user device 34 to provide time stamp (or event wall clock time) and other identifying information about the segment, as shown by the lines 230 in FIG. 2A. The Sync Messages 230 may be any form of notice that communicates the desired synchronization information about the video segment being delivered or available to the user device 34 for playing or displaying. Alternatively, in some embodiments, the synchronization server 50 or the functions it performs may be part of the video processing system 36 or may be part of the video distribution system 38, or a combination thereof, for creating and sending the Sync Messages 230 to the user devices 34.

Also, external data to be synchronized with the live event may be provided to or requested by the client device or the host app 37, such as realtime sports data feed from data providers at the event (such as Gamecast® or the like), which provide realtime live data feeds from the event location, e.g., "Player A struck out", or "Player A hit a home run", and the like, and may be stored in or accessed from a Game Data Server 46. Such data also has a recording wall clock time stamp for each event, indicative of when the comment was made.

Other external video-related data sources may include: fantasy sports sources, which may provide updates or alerts on fantasy sports related events for a given user; online betting sources, e.g., FanDuel® or Draftkings® or the like, which may provide updates or alerts on results of bets or wagers placed by the user, and user preferences or favorites indicative of a users favorite players or sports teams, which may provide updates or alerts when a user's team or player does something special. Each of the other video-related data sources also provide a timestamp related to or indicative of the time stamp for the video being played.

In some embodiments, other external video-related data sources may include social media feeds, such as Twitter®, Facebook®, Instagram®, Snapchat®, or the like, which show fan reactions to a given play, and also provide a timestamp when created that is related to or indicative of the time stamp for the video being played, and may be stored in or accessed from the Other Video-related Data Server 42.

Also, there may be a video analysis service provided from a Video Analysis Server 44, which communicates with the user device on a line 48, which analyzes the live produced video, e.g., from the distribution system 38 on a line 49, which may include the raw video footage and any added graphics, data, or content, such as game score, company or team logos or the like, on the line 49 and may be stored in or accessed from the Video Analysis Server 44. Such a service may analyze the produced video using computer vision techniques to detect the graphics and communicate what is detected to the client, and may provide real-time Video Data (or metadata) about the produced video, such as what graphics, data, or content has been added to the original raw video feed, which also includes a timestamp of what graphics are on the screen at a particular time and may also include specific video segment and frame (e.g., Segment ID and Frame Index) information associated with the graphics or content. The Video Data may be also referred to herein as a Detection Message. In some embodiments, the Video Data or Detection Message may also include x,y screen coordinate location of the graphics and size or dimensions (e.g., height, width, or the like) of the graphics and a confidence factor for the graphic detected. Also, in some embodiments, the line 54 (FIG. 1) may also feed the video analysis server 44 to access the produced video data for analysis, or the video analysis server 44 or the functions it performs, may be part of the synchronization server 50. Alternatively, the video analysis server 44 may obtain the produced digital video from another source, e.g., on-line or other source.

Also, the external data received from the various sources and servers together with their respective timestamps, or segments or frames, may be stored in an External Data Cache & Logic Server 55 (see FIG. 4B and FIG. 4C), which communicates with the user device on a line 56. It may also contain logic for what to do when certain external data is detected or received by the client/user device, such as auxiliary or additional general or personalized client-specific content to display on the user display screen with the original video that are synchronized to the video being played or alerts or messages to send to the user when certain events happen. The External Data Cache & Logic Server 55 may also store data relating to a user's preferences or activities, such as a user's favorite or followed teams or players of interest to that user, or fantasy sports for that user, or user on-line wagering activities or results for that user.

Figure 2B:
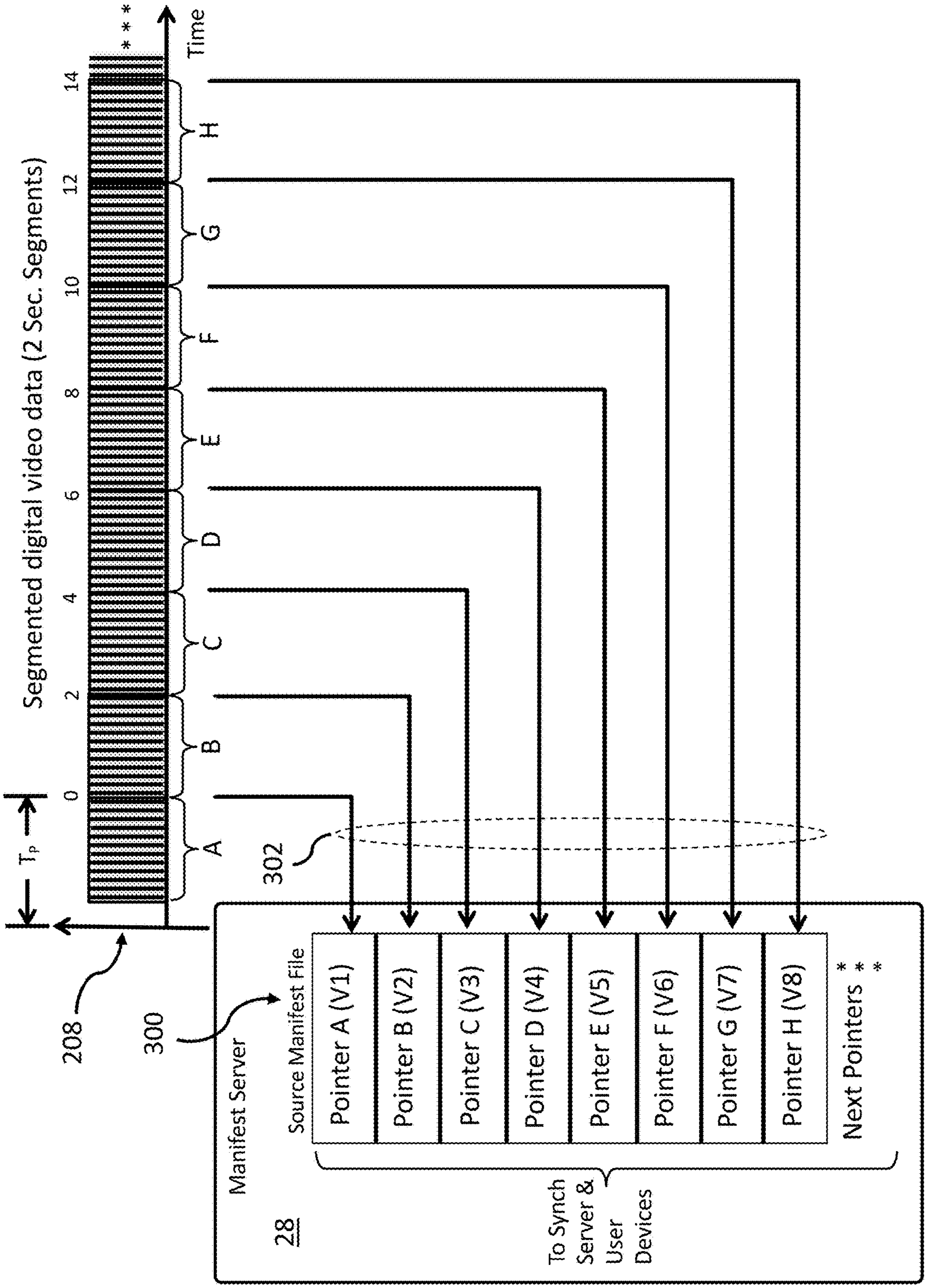
FIG. 2B is a graph showing generalized data formats for segmented video data, timing, and a sample source manifest file, in accordance with embodiments of the present disclosure.

Referring to FIG. 2B, a manifest file 300, or "source" manifest file (on the manifest server 28) is shown in conjunction with the timing from the timeline graph 208 showing when the video segment/chunk files are written to (or stored or saved on) the video segment server 26 (FIG. 1). After each new video segment (or chunk) file A-H is packaged and stored on the video segment server, the manifest file 300 (FIG. 2B) on the manifest server 28 is updated with a new pointer (Pointer A-Pointer H) which points to the location of new (or newest) segment file in the segment server 26 (FIG. 1), as shown by the lines 302 (FIG. 3). Once a given pointer, e.g., Pointer A to Pointer H, is written to the manifest file 300, the Sync Message 230 is provided to the client device 34, as indicated by the Sync Message lines 230 (shown in FIG. 2A), discussed more hereinafter.

The source manifest file 300 may be continually updated on the manifest server 28 as the video source data 200 (FIG. 2A) is received and processed by the encoder 16 and slicer/packager 20 (FIG. 1). Also, the manifest file 300 may be a rolling or shifting file (or stack) of fixed size, e.g., 20 video links or pointers, such that when a new pointer comes in at one end of the stack (e.g., bottom end), the oldest pointer is removed from the other end (e.g., top end). The manifest file 300 may be accessed by the synchronization server 50 and user devices 34 to provide the functions described herein.

The manifest file 300 (FIG. 3) may have any digital format and specify any information needed to provide the functions described herein. For example, the manifest file 300 may include information identifying the video segment (or chunk) file location (e.g., which may be in a format such as https://server/segment_filename), as well as information or metadata identifying the segment length/duration, time stamp, the segment or media file sequence number or serial number, the size, the bit rate, sample rate, the bandwidth, the resolution (e.g., 320×180, 480×272, 576×324, 640×360, 768×432, 960×540, 1280×720, and the like), whether it is an audio or video file, and information specifying any encryption or other special formatting or processing required to play the segment. The manifest file 300 may also specify any digital rights management controls associated with the segment or stream. In some embodiments, each of the manifest files may be provided in a known format, such as text file (e.g., .m3u8 or the like) for HLS streaming, XML-based text file for DASH streaming (e.g., f4m XML file or the like) for HDS, or other file types. Also, for "adaptive bit rate" streaming, there may be a "top-level" or "master" manifest that points to one or more different manifests each manifest associated with a different resolution for a given video segment, which enables user devices to use more or less bandwidth/resolution based on certain conditions, e.g., speed of the network, at any given time for any given video segment. In that case, the client user device 34 (FIG. 1) may obtain the updated manifest pointer or link for the video resolution it needs at a given time, or it may obtain the "top-level" manifest pointers/links and the lower level manifest pointers for all the available resolutions.

Each of the individual video segment files A-H (FIGS. 2-3) produced by the slicer/packager 20 (FIG. 1) may be generated in any desired compatible format, such as MP4 file format for HLS; however, any other format may be used if desired.

Referring again to FIG. 1, the encoder 16 and the packager 20 may be viewed as part of a computer-based video processing system 36 that processes input video data from one or more video sources 12 and provides a digitized segmented series of video segment files A-H (FIG. 2) indicative of the input video data, to the video segment server 26, and also provides the manifest file 300 (FIG. 3) indicative of the location and characteristics (or metadata) of the video segment files A-H to the manifest server 28. In addition, the order of the encoder 16 and packager 20 in the processing system 36 may be reversed if desired. In that case, the video signal from the source 12 may be packaged/segmented first, and then encoded. Alternatively, the encoder 16 and packager 20 may be performed using a single component, device or logic. Also, the encoder 16, packager 20 (or both) may reside inside the video camera or video source 12 itself.

Also, the video segment server 26 and manifest server 28, may be viewed as a distribution system 38, which distributes the manifest files 300 (FIG. 3) and video segment files A-H (FIGS. 2-3) to one or more of the client/user devices 34 (FIG. 1). In particular, the distribution system 38 may include one or more standard web servers for delivering data streams and other files to the client devices. The distribution system 38 may be or include a content delivery network, an edge network, or the like. The video segment server 26 and the manifest server 28 may be part of the same file server, and may be referred to herein collectively as "media" servers. Also, the media source 12, the processing system 36 and the distribution/server system 38 may be referred to herein collectively as a "media system." Also, the video processing system 36 and video distribution system 38 may be similar to that described in commonly owned U.S. Pat. No. 10,009,659 to Reisner, which is incorporated herein by reference to the extent necessary to understand the present disclosure.

The client devices 34 may be any computing devices capable of receiving and displaying media information distributed by the distribution system 38 over the appropriate communication protocols and connections. For example, the client device 18 may include desktop computers, mobile smartphones, tablet computers, laptop computers, set top boxes, tablet computers, Internet-connected (or smart) televisions, or the like. Each of the client devices 34 operates client application software, such as a Web Browser or the like, to access and obtain data provided by the distribution system 16, such as, for example, manifest files based on a URL or pointer identifying a desired stream of media. The device 34 may also have a Host App 37, e.g., a streaming event app, or video streaming app, such as a sports app or the like, and a video player 39, which displays video data from the streaming app, e.g., via a video input buffer, onto the display screen 35 of the client/user device 34 for viewing by the user.

The client device 34 uses information in the manifest file to identify the location of a series of media files in a stream. The client device 34 downloads each media file (or "chunk" or segment) in sequence. Once the client/user device 34 has obtained a sufficient amount of downloaded data, the client device 34 presents or displays the sequence of media files to the user of the client device 34. The client device 34 obtains the manifest files from the manifest server 28 in the distribution system 38, discussed more hereinafter.

Figure 3A:
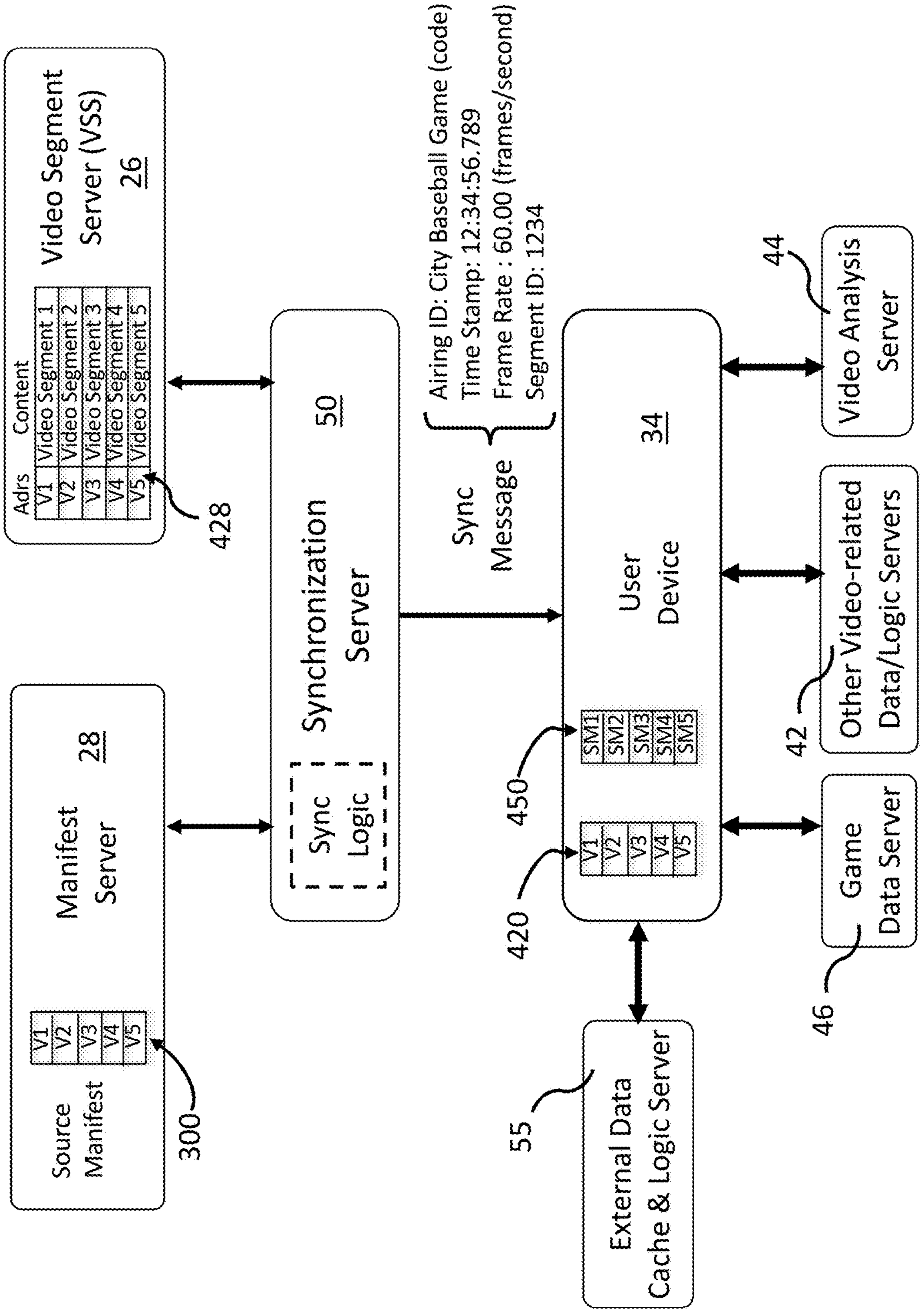
FIG. 3A is a block diagram showing communications between a synchronization server and a manifest server, video segment server (VSS), and a user device, in accordance with embodiments of the present disclosure.

Referring to FIG. 3A, the synchronization server 50, which may have Sync Logic therein that executes logic to perform the functions described herein of the synchronization server 50, obtains the source manifest file 300 from the manifest server 28 and the video segments 428 from the video segment server 26 and creates the synchronization message (or Sync Message) having the following information or data: AiringID (identifies the specific live feed event, airings or programs or streams), Timestamp (reference time close to the actual event recording, i.e., "wall clock" time), FrameRate (video playback rate), SegmentID (identifies the video segment). For example, the Sync Message may be: "for airing <Team X v Y baseball game>, segment <1234F>, timestamp of first frame of the segment <2022-09-21T09:56:12.343Z>". The Sync Message may have other or different amount of information if desired, provided the client can perform the synchronization of external data with playing video. For example, in some embodiments, if the Airing ID is already known by the client (as it knows what airing it is playing) and the Segment ID is known by the client from other sources (such as a predefined list of Segment IDs), the Sync Message may contain just the Timestamp and FrameRate, or if the Frame Rate is already known by the client (as a default frame rate condition, e.g., 60 frames per second), the Sync Message may contain only the Timestamp. When adaptive bit rate streaming is used, the Segment ID may also indicate which bit rate or resolution is being used for the segment, which maybe indicated by a letter A-F at the beginning of the Segment ID (e.g., "F1234", may be the version of Segment 1234 associated with bit rate F). The purpose of the Sync Message is to provide the client additional data (e.g., wall clock time) about each video segment that the client plays, so that the client can present or display external data from other sources (such as "play-by-play" game events data) in sync with a specific video frame within the segment being played by the client that corresponds to the wall clock time stamp associated with the external data.

In particular, to create the Sync Message, the synchronization server reads the source manifest file and when a new video segment is received, it downloads and processes it to determine the Segment ID and timestamp (event wall clock time) of the first frame in the segment, using a tool such as FFMPEG, an open-source tool for working with video. More specifically, the tool downloads the file from the URL address, identifies and splits apart the video, audio and data streams from within the segment, i.e., "de-muxes" it, into "packets" that contain one or more video frames, audio, and timed metadata tags (e.g., ID3 tags). The host app logic inspects the packets to find any ID3 tags and video frames. Certain ID3 tags contain time stamps, indicative of the "wall clock" time, that are added (or inserted) by the video processing system 36 (FIG. 1) to the start of each segment that appear in the packet with the first stream of video for a particular video segment. In some embodiments, the ID3 tag timestamps may be obtained or extracted from the video by using a video playback library to parse the ID3 tags into readable streams. The ID3 tag timestamp may be about 0.5 to 1 second behind the actual event wall clock time (e.g., when it is inserted by the video processing system 36); however, this is close enough to be used for wall clock time for the present disclosure. Once the ID3 tag timestamp value is obtained, the logic on the synchronization server 50 creates and sends (or pushes) the Sync Message to the client user device 34 over the persistent connection, which it can then use it to synchronize the external data to the video being played by identifying each frame, discussed more hereinafter with FIGS. 4A-4D.

In some embodiments, the Sync Message may comprise the actual wall clock time directly from the event, e.g., when the wall clock time is provided directly by the video source 12 (FIG. 1) at the event (discussed hereinabove), or any other approach to minimize the delay between the event "wall clock" time and the timestamp in the video segment. In that case, the time stamp in the Sync Message may be the same as or very close to (e.g., milliseconds behind) the actual event wall clock time when the video was captured or recorded by the video cameras or video sources 12 (FIG. 1) at the event. The event recording wall clock time as used herein is intended to represent a time that is very close to (e.g., within about 1 second of) the time at the event when the video was captured or recorded by the video cameras or video sources 12 (FIG. 1) at the event, such that synchronizing external realtime event data to such recording wall clock time would not create issues regarding advance notice or spoilers for occurrences at the event that are being played on the user device.

Figure 3B:
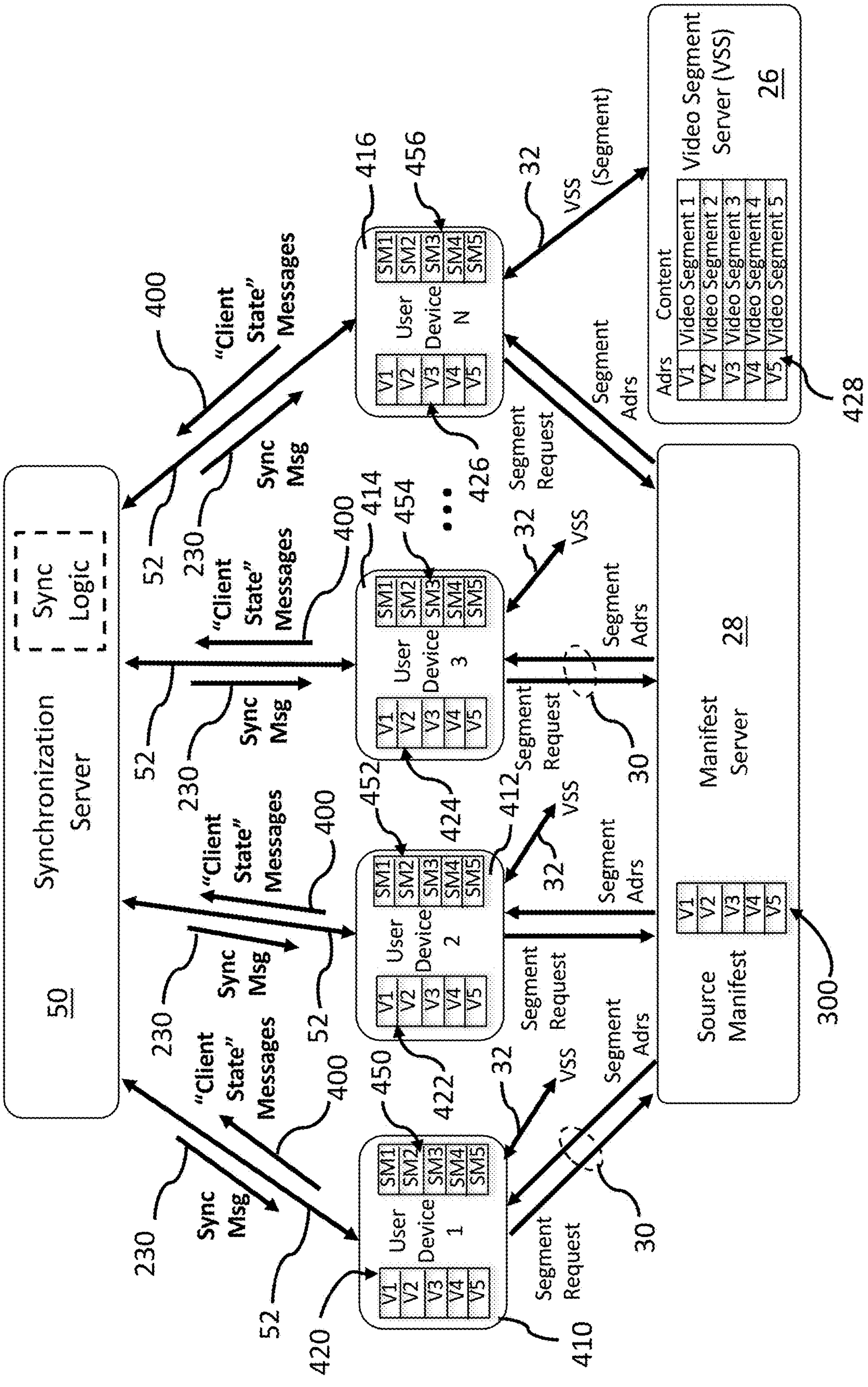
FIG. 3B is a block diagram showing communications between multiple user devices and a synchronization server, a manifest server, and a video segment server, in accordance with embodiments of the present disclosure.

While the block diagrams in FIG. 1, FIG. 3A and FIG. 3B, show, for illustrative purposes, the user device(s) 34 communicating directly with the synchronization server 50, the game data server 46, the video analysis server 44, and the other video-related data servers 42, it should be understood that there may be other servers between them which facilitate the efficient transfer of data and balance the data loads, the content and data may be provided to the user devices (or clients) via the internet using a distributed network of computer-based data file servers deployed in one or more data centers, also referred to as a content delivery network or content distribution network (collectively, CDN). For example, on the server side, there may be a separate synchronization server for each streaming game or for each broadcast, and each synchronization server may communicate with a plurality (e.g., 1K to 100K or more) web backend servers (BES) 58, and each backend server servicing 100 to 1,000 or more user devices. In some embodiments, some of the backend servers may include an event bus channel, e.g., Apache® Kafka® unified distributed event streaming platform. Other backend server structures or buses may be used if desired. In some embodiments, the backend server(s) 58 may contain logic that consolidates all the server-to-client data messages, e.g., Sync, Play-by-Play, Video Data Analysis, Fantasy, Betting, and the like. In that case, when the client opens the persistent connection, it may open it with the backend server (BES). In particular, in that case, when the client device opens the persistent connection, it provides the backend server with "Client State" message information (discussed hereinafter), and based on that information, the backend server 58 may send the consolidated data messages, e.g., Sync, Play-by-Play, Video Data Analysis, Fantasy, Betting, and the like, to the client device.

Referring to FIG. 3B, as discussed above, the client/user devices 34 (FIG. 1), shown as devices 410-416 in FIG. 3B, communicate with the manifest server 28 and the video segment server 26 to obtain the manifest file 300 (FIG. 3), or updates therefrom, and the video content segment files. When one or more of the user devices 410-416 desires to stream a given video, the respective user device 410-416 opens a low-bandwidth "persistent connection" with the synchronization server 50 and sends a "Client State" message over the persistent connection with a client "Sync Message Add Request" message 400 on the line 52 to the synchronization server 50, e.g., indicating that user X is watching video Y, on device type Z, or other user information, such as: "user <Joe>, airing <Team X v Y baseball game>, client <iOS>". The device 410-415 may also send an optional "video streaming request" message prior to and separate from the client Sync Message Add Request, if desired, to indicate it desires to stream video. In response to the client Sync Message Add Request, the synchronization server 50 adds the respective client to the Sync Message receiver or subscriber list to send Sync Messages to via the persistent connection when new video segments are ready for viewing. The persistent connection may be referred to herein as a supplemental realtime data persistent connection, which connection is a separate or independent communication connection or path from the video segment communication connection between the user device and the segment server and the manifest file communication connection between the user device and the manifest server. More specifically, the supplemental realtime data persistent connection is a "stateful" persistent connection, such as "websockets", HTTP long polling, plain TCP sockets, or any other persistent connection capable of performing the functions described herein, is created between the associated client/user devices 410-416 and the synchronization server 50, and every time the synchronization server 50 has an updated Sync Message 230, the synchronization server 50 sends (or broadcasts or pushes) the Sync Message 230 over the persistent connection simultaneously to all the client/user devices 410-416 that have requested or subscribed to the persistent connection, as shown by the line 230 as the Sync Message (also shown in FIGS. 2A and 2B). The persistent connection may also be referred to herein as a separate "side-car" channel. The Sync Message 230 may be, for example, a small JSON string, which is an extremely low-bandwidth-consuming communication containing a small amount of text. Accordingly, it does not require much network server or device overhead to manage the supplemental real-time data persistent connection. Other file or string types may be used if desired.

Thus, when a new video segment file is available for viewing and the source manifest file 300 has been updated in the manifest server 28, shown as having pointers V1-V5, the synchronization server 50 automatically provides the updated (or changed) Sync Message 230 simultaneously to all the corresponding clients/user devices 410-416 that have created the persistent connection. Each of the client user devices 410-416 may create its own local manifest file 420-426, respectively, each file 420-426 having its own corresponding manifest pointers V1-V5, which is populated with the newest or next pointers from the manifest server 28 for the next video segment when it becomes available. For example, an updated manifest pointer (and metadata) may be loaded into the local manifest files 420-426 (or buffer, or cache, or queue, or stack) in the client/user devices 410-416. Similarly, each of the client user devices 410-416 may create its own local Sync Message files 450-456 (or buffer, or cache, or queue, or stack), in the client/user devices 410-416 shown as SM1-SM5 for each cache, respectively, each file being populated with the newest Sync Message associated with the newest video segment when it becomes available.

In some embodiments, only the changes or updates to the pointers V1-V5 in the source manifest file 300 are sent to the client/user devices 410-416 for display by the devices 410-416, not the entire manifest file 300. The client/user device 410-416 may request an initial download of the full manifest file 300 from the manifest server to obtain the initial pointers and metadata (and the manifest server information) and then update the manifest as it receives updated pointers, or it can build the manifest file from the updates received from the manifest server. Also, in some embodiments, instead of a single local manifest file or buffer 420-426 in the user devices 410-416, there may be multiple buffers, such as fetching buffer and a playback buffer (which is the buffer of content to be played on the device) in the client devices, all are collectively referred to as the local manifest files 420-426 herein. Other configurations for the local manifest may be used in the user devices 410-416, if desired.

Also, when a new segment or chunk file is available for downloading, the user devices 410-416 receive the corresponding Sync Message 230 and may obtain the segment video files, shown by a table 428 with address pointers V1-V5 corresponding to video segments Video Segment 1-Video Segment 5, from the video segment server 26 on the lines 32, using the standard media HTTP-based caching and distribution. The user device 410-416 may download the segment file having the desired quality, resolution or variant that is needed or capable of being viewed for that segment, in view of various performance factors, such as network speed and the like. Also, the video segments may be downloaded from the segment server 26 using standard protocols/handshakes based on the connection used, including any requests for access and downloads. The connection between the user devices 410-416 and the segment server 26 for downloading the video segments to the user devices 410-416 may also be referred to herein as a "segment delivery connection" or "segment connection."

Figure 4A:
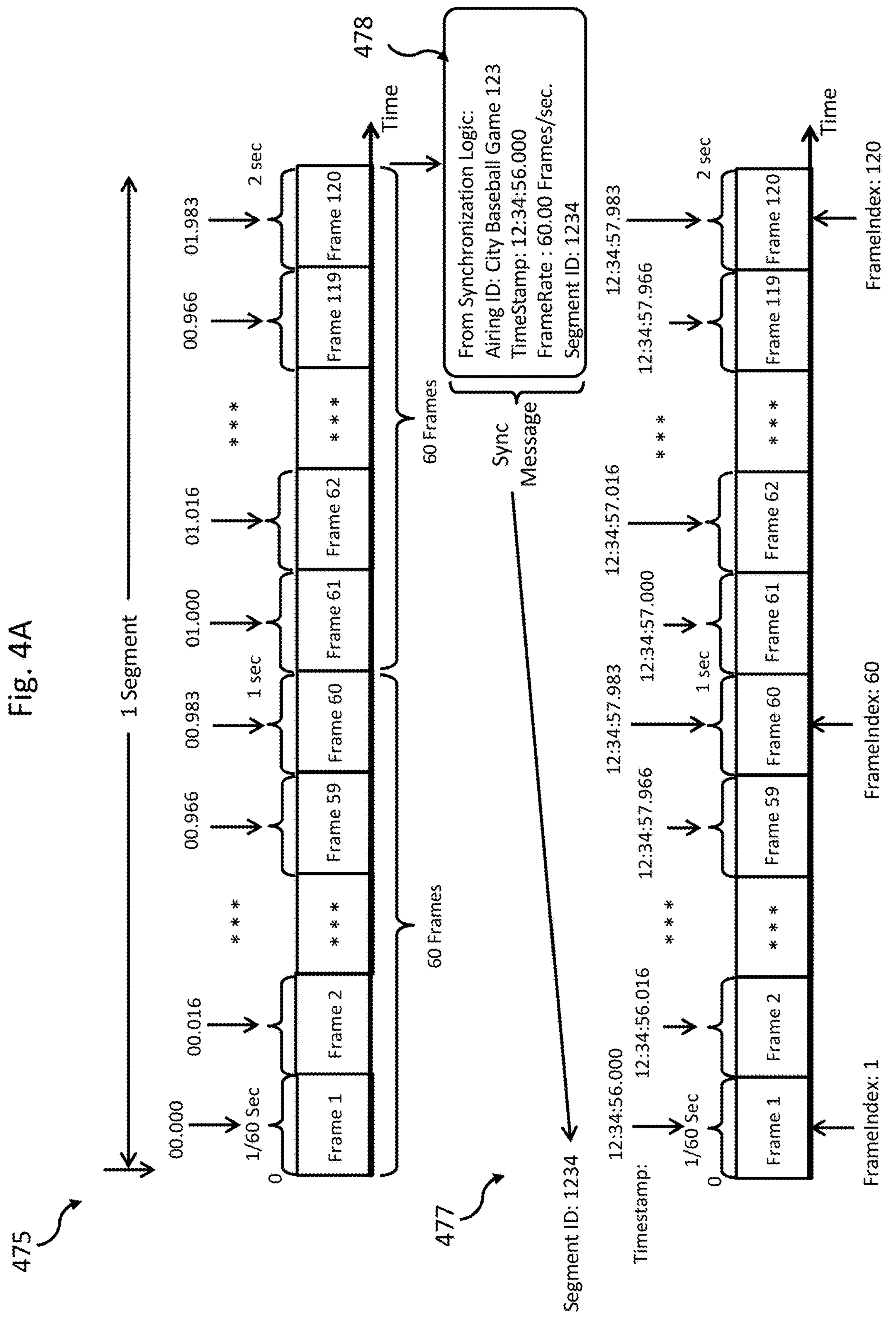
FIG. 4A is a diagram showing a video segment and video frames within the segment, and showing time stamps of a general segment and specific segment, as well as a sample Sync Message, in accordance with embodiments of the present disclosure.

Referring to FIG. 4A, an upper diagram 475 shows a single 2 second video segment broken into 120 frames having a frame rate of 60 frames/sec, or 1/60 second (0.016666 sec) per frame. Accordingly, if the framerate is 60 frames/sec, then each frame adds 1/60 sec (or about 0.016 sec), and the $60^{th}$ frame ends at 1 second. In another example, if the framerate is provided as 59.94 frames/sec, the time duration per frame would be 1,000 msec/59.94=16.68 msec per frame (or 0.0168 sec/frame). FIG. 4A also shows the Sync Message 478 generated by the synchronization server logic, as discussed herein. The client logic calculates an adjusted timestamp from the Sync Message for each following video frame in the segment to get each frame's calculated event wall clock time as discussed further below.

In particular, a lower diagram 477 of FIG. 4A shows a timestamped (or tagged) video segment broken into 120 frames (similar to the upper diagram 475), which corresponds to the Sync Message 478 received for SegmentID 1234 having a video segment starting or first frame timestamp of 12:34:56.000, where the timestamp format is XX:XX:XX.XXX. After the Sync Message 230 is received by the client, the client host app logic calculates an adjusted timestamp for each following video frame in the video segment to get each frame's calculated event wall clock time, which may be referred to herein as the client timestamped (or tagged) video segment. Thus, Frame 2 of Segment ID 1234 occurs 0.016 seconds later at 12:34:56:016 and Frame 61 occurs at 12:34:57.000, and Frame 120 occurs at 12:34:57.984 for this segment of video. The timestamps described herein refer generally to the video frame as a whole and do not correspond to any particular point within the 16 milliseconds that elapse during the capture (or recording) of a given video frame, a portion of which is the video camera exposure time of the frame.

Figure 4B:
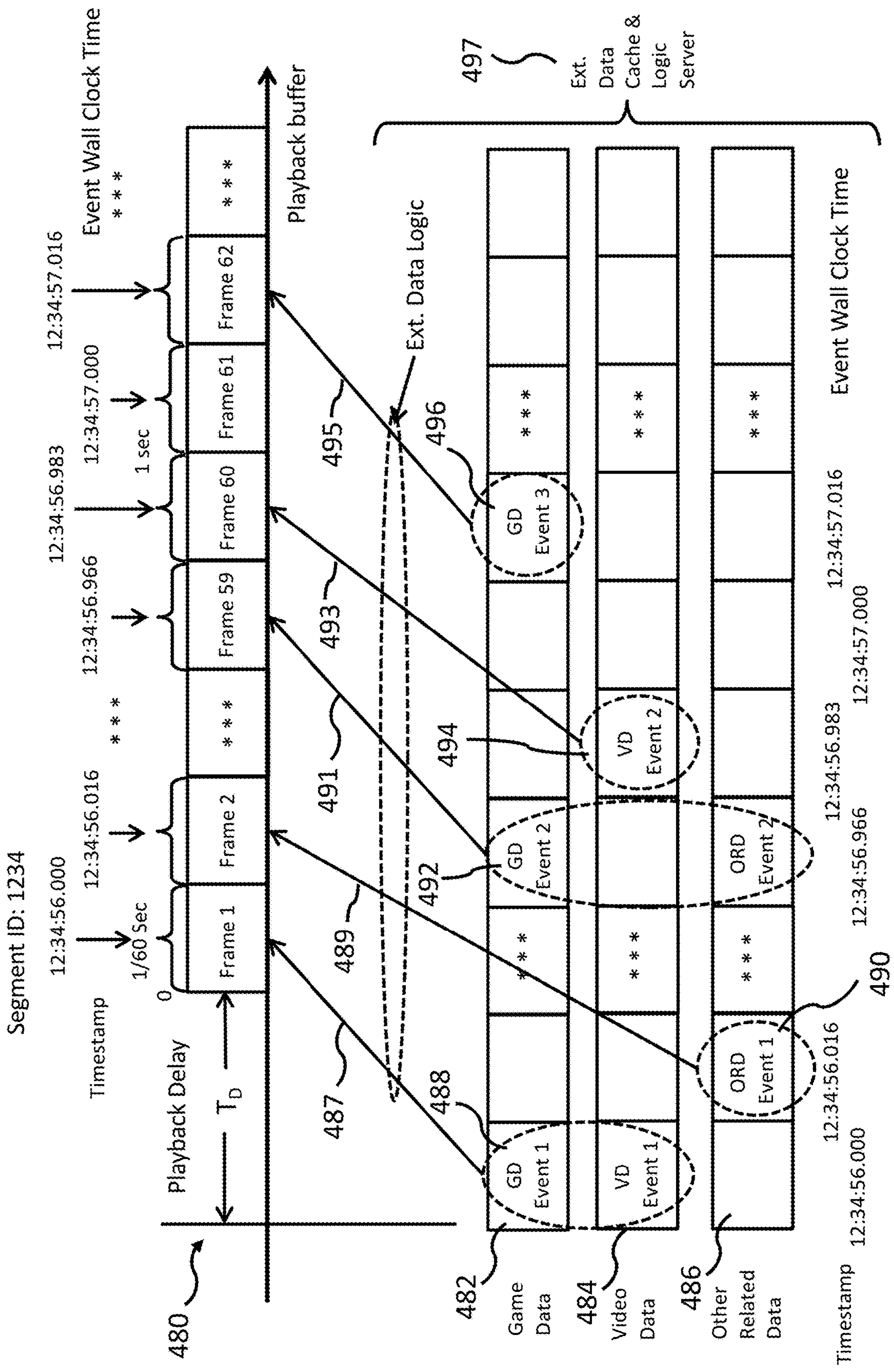
FIG. 4B is a diagram showing a playback delay ($T_D$) of a live video and how external text events are queued up waiting for the video segment and frame being played to incorporate the external text into the video stream, in accordance with embodiments of the present disclosure.

Referring to FIG. 4B and FIG. 4C, FIG. 4B is a diagram showing a playback delay ($T_D$) of a live video and how external data events are queued up waiting for the video segment and frame being played to incorporate the external text into the video stream, and FIG. 4C shows an external data cache & logic table 460 which may be saved in the external data cache & logic server 62, which shows external data sources that provide external data to the user device, external data received from the sources and logic or actions to take based on the external data received. In particular, referring to FIG. 4B, an upper diagram 480 shows a portion of Segment ID 1234 from FIG. 4A, showing the video playback events or buffer or queue for the segment, where the Timestamps shown are considered event wall clock times for each frame (as described above). It also shows that Frame 1 of the playback buffer is delayed by a playback delay time $T_D$, which is the time from when a given event occurred and the time the player plays the event on the user device. The playback delay time value may be based on many factors, such as pausing time, buffering time, or other delay times.

It also shows three external data streams, e.g., real-time game data 482, video data 484, and other related data 486, which have been previously received or requested by the client, and may be stored by the client in the Ext. Data Cache & Logic Server 55 as indicated by a line 497, and the client is waiting for the video player to catch-up to play a Segment and Frame having an event wall clock time (or timestamp) of 12:34:56.000, corresponding to the previously stored event.

In some embodiments, the timestamp used herein includes a date and time, such as "2022-12-31T12:34:56.000Z", which is the ISO 8601 standard timestamp format for 12:34 pm on Dec. 31, 2022, where T indicates the beginning of the time, and Z indicates the time zone (e.g., Zulu or UTC—Universal Time Coordinated). Other time and date formats may be used if desired.

Referring to FIG. 4B and FIG. 4C, in particular, Game Data 482 has events at three wall clock time slots shown: 12:34:56.000 (GD Event 1); 12:34:56.966 (GD Event 2);

12:34:57.016 (GD Event 3). Also, Video Data (or Detection Messages) 484 has events at 2 time slots: 12:34:56.000 (VD Event 1); 12:34:56.983 (VD Event 2). Also, Other Related Data (ORD) 486 has events at 2 time slots shown: 12:34:56.016 (ORD Event 1); 12:34:56.966 (ORD Event 2).

In that case, GD Event 1 (e.g., Player 22 hit a home run), and VD Event 1 (e.g., updated score is displayed), both have events at the wall clock time of 12:34:56.000, shown in the dashed oval 488, which the client host app logic will add to the player buffer to overlay onto or play together with Frame 1 of Segment 1234 when Frame 1 gets played by the device player, thereby synchronizing the external data events 488 (Game Data and Video Data) with the playing of the event video segment and frame corresponding to the same wall clock time, as shown by a line 487. The logic in the Ext. Data Cache & Logic Server 55 may specify that certain GD events be displayed on a certain portion of the screen, e.g., lower bottom center, upper right, lower left, left banner, right banner, top banner, bottom banner, and the like. For this example, the logic, which may be in the External Data Cache & Logic table 460 (FIG. 4C) is indicating to have the sports host app display both the GD Event 1 and the VD Event 1 in the real-time game data section on the lower or side screen (see Live Realtime Game Data section 512 in FIG. 5).

Similar logic to that described above may occur for the other events shown in FIG. 4B. In particular, the next event is the ORD Event 1 (e.g., the user's online sports Fantasy account provided an alert indicating that "Your fantasy team score increased 10 points"), shown by dashed oval 490, having a wall clock time of 12:34:56.016, which corresponds to the beginning of Frame 2 of Segment 1234, which the client host app logic will add to the player buffer to overlay onto or play together with Frame 2 of Segment 1234 when Frame 2 gets played by the device player, as shown by a line 489. In this case, the logic which may be in the Ext. Data Cache & Logic Server 55 may provide instructions to the host app to display the comment in a lower banner on the screen, or in a separate social media window on another part of the user's screen. For this example, the external data logic/actions in the external data cache & logic table 760 is indicating to display the tweet in a lower center banner on the main video screen.

Similarly, the next events shown are the GD Event 2 (e.g., player 34 stole home) and ORD Event 2 (e.g., the user's online sports betting account provided an alert indicating that "You just won your 3-way parlay bet"), shown by dashed oval 492, having a wall clock time of 12:34:56.966, which corresponds to the beginning of Frame index number 59 of Segment 1234, which the client host app logic will add to play buffer to overlay onto or play together with Frame 59 of Segment 1234 when Frame 59 gets played by the device player, as shown by a line 491. For this example, the logic, which may be in the External Data Cache & Logic table 460 (FIG. 4C) is indicating to the sports host app to display the GD Event 2 in the real-time game data section on the lower or side screen (see Live Realtime Game Data section 512 in FIG. 5), and the logic in indicating to have ORD Event 2 displayed in a separate alert pop-up window on another part of the user's screen.

Similarly, the next event shown is the VD Event 2 (e.g., return from commercial), shown by dashed oval 494, having a wall clock time of 12:34:56.983, which corresponds to the beginning of Frame index number 60 of Segment 1234, which the client host app logic will add to play buffer to overlay onto or play together with Frame 60 of Segment 1234 when Frame 60 gets played by the device player, as shown by a line 493. For this example, the logic, which may be in the External Data Cache & Logic table 460 (FIG. 4C) is indicating to the host app to display the Sports Company (e.g., ESPN or other network) logo on the lower right side of screen when the video returns from commercial (as indicated by the VD Event 2 data).

Finally, the next event shown is the GD Event 3 (e.g., Player 55 dropped a fly ball causing run to score), shown by a dashed oval 496, having a wall clock time of 12:34:57.016, which corresponds to the beginning of Frame 62 of Segment 1234, which the client host app logic will add to play buffer to overlay onto or play together with Frame 62 of Segment 1234 when Frame 62 gets played by the device player, as shown by a line 495. For this example, the logic, which may be in the External Data Cache & Logic table 460 (FIG. 4C) is indicating to the host app to display the GD Event 3 in the real-time game data section on the lower or side screen (see Live Realtime Game Data section 512 in FIG. 5).

Also, in some embodiments, the host app logic may communicate with other apps on the user's device to disable auto alerts or pop-up messages from other sources, such as social media, email, texts, or the like to avoid such services from providing undesired advance notice or spoilers to the user. Such logic may be defined in the other External Data Cache & Logic Server 55.

In some embodiments, the client video player may provide notice to the client host app, e.g., a "callback", indicating which segment is starting and which frame is being played to the device screen. In that case, the client host app may wait for or check for the callback and then provide the appropriate data to be displayed to the video player. In some embodiments, there may be a pre-play buffer which can be populated shortly before playing to ensure the appropriate data gets into the correct video frame when played. The size of the buffer will determine how far in advance the buffer can be filled. Any other technique may be used to feed the device player the desired data to be displayed that provides similar function and performance to that described herein.

Figure 4D:
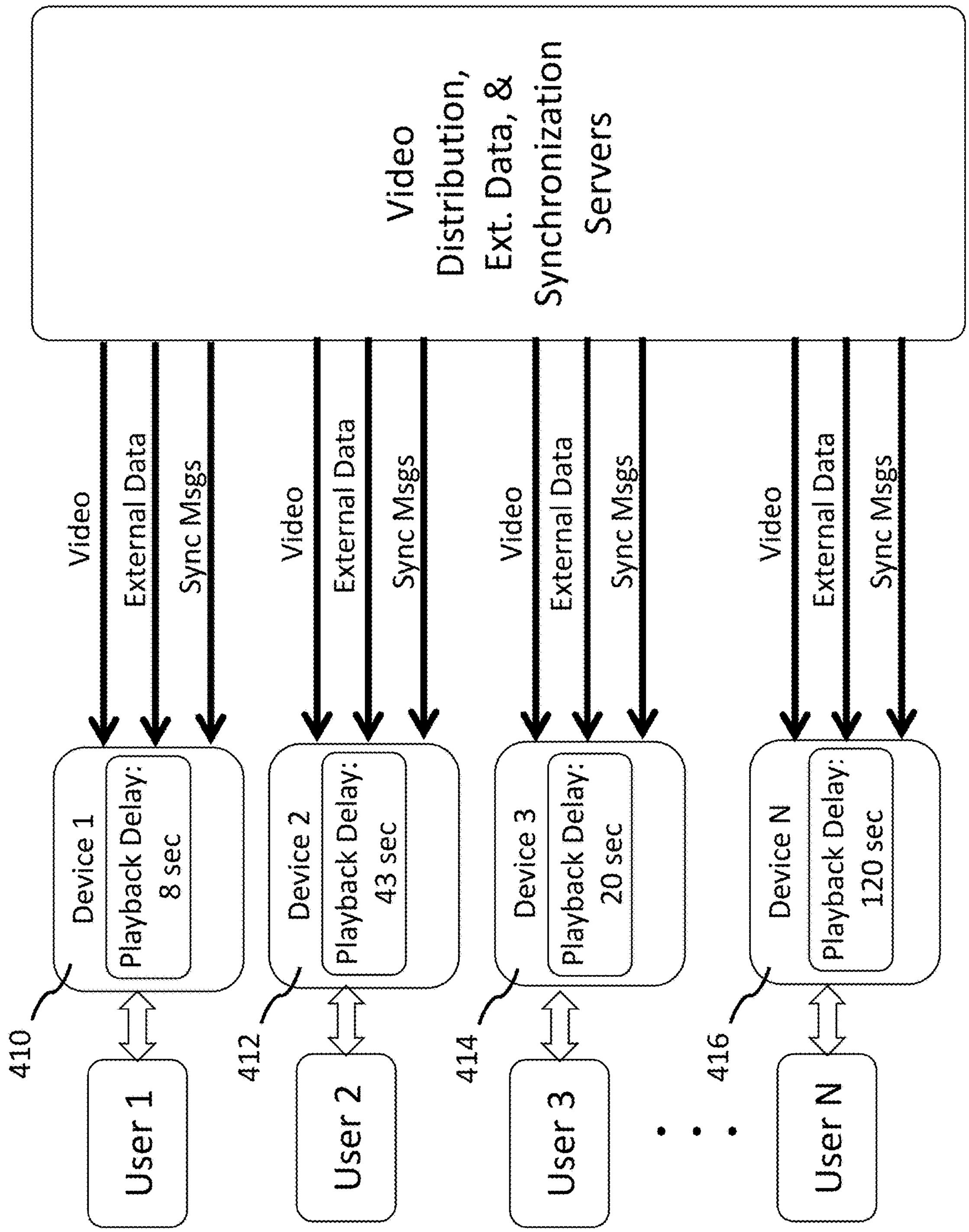
FIG. 4D is a block diagram showing communications between multiple user devices and video distribution, text and synchronization servers, showing how each user device may have different playback delay times, in accordance with embodiments of the present disclosure.

Referring to FIG. 4D a block diagram showing communications between multiple user devices and video distribution, text, and synchronization servers, shows how each user device may each have different playback delay times. In particular, the playback delay time experienced by each of the user Devices 410-416, may be different, e.g., 8 sec., 43 sec., 20 sec., 120 sec., respectively, due to the nature of how video streaming and video players generally function, due to pausing and buffering, and other delay effects. As a result, each user's device will likely be playing a different video segment or frame at any given point in time. Thus, even though the video stream is not personalized to a particular user, a given user's rendering of the stream is personized to that user for that user device. Therefore, the client app synchronization logic cannot simply delay all the data by the same amount. Instead, the client logic must delay each user's data (for a given device) by the amount needed to achieve the desired synchronization of external data and live video playing, e.g., as shown in FIG. 4D. The desired data-video synchronization is achieved by the client logic by matching the timestamp (wall clock time) of the external data with the timestamp (wall clock time) of the tagged segment and frame of the playing video.

Figure 5:
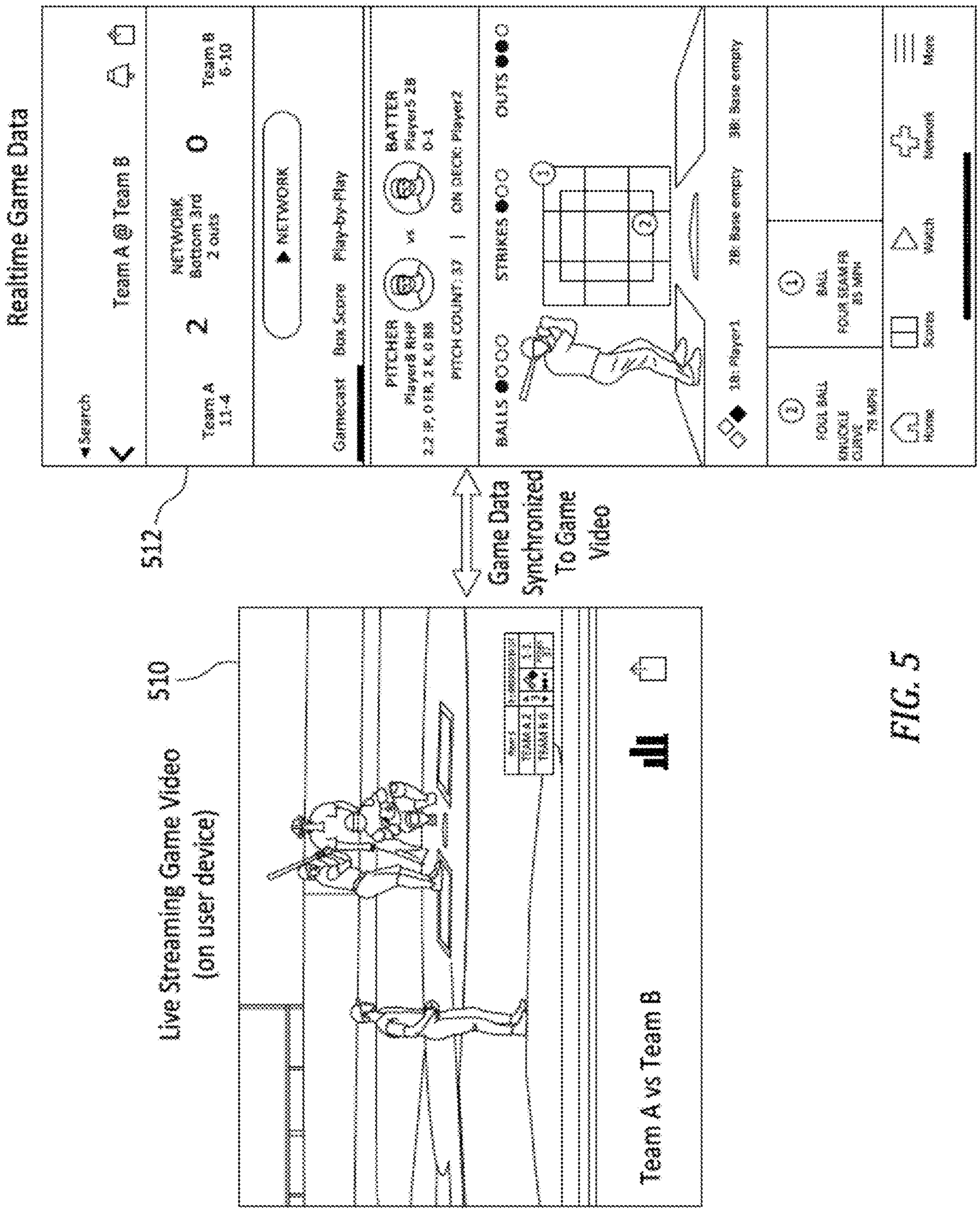
FIG. 5 is a diagram showing a live streaming event and external data which is synchronized to the playing video, in accordance with embodiments of the present disclosure.

Referring to FIG. 5, a diagram of a live streaming event and external data which is synchronized to the playing video is shown. In particular, a video display 510 of a live streamed game by the client host app on the client device is shown on the left side and the live real-time game data 512 (e.g., balls, strikes, pitches, and the like), is displayed by the client host (sports) app on the client device is shown on the right side. In this case, the game video 510 and game data 512 are synchronized as described herein such that the data (which arrives at the device before the video) is displayed in sync with the video of the game (i.e., the data is not displayed until the video being played catches-up to the data).

Figure 6A:
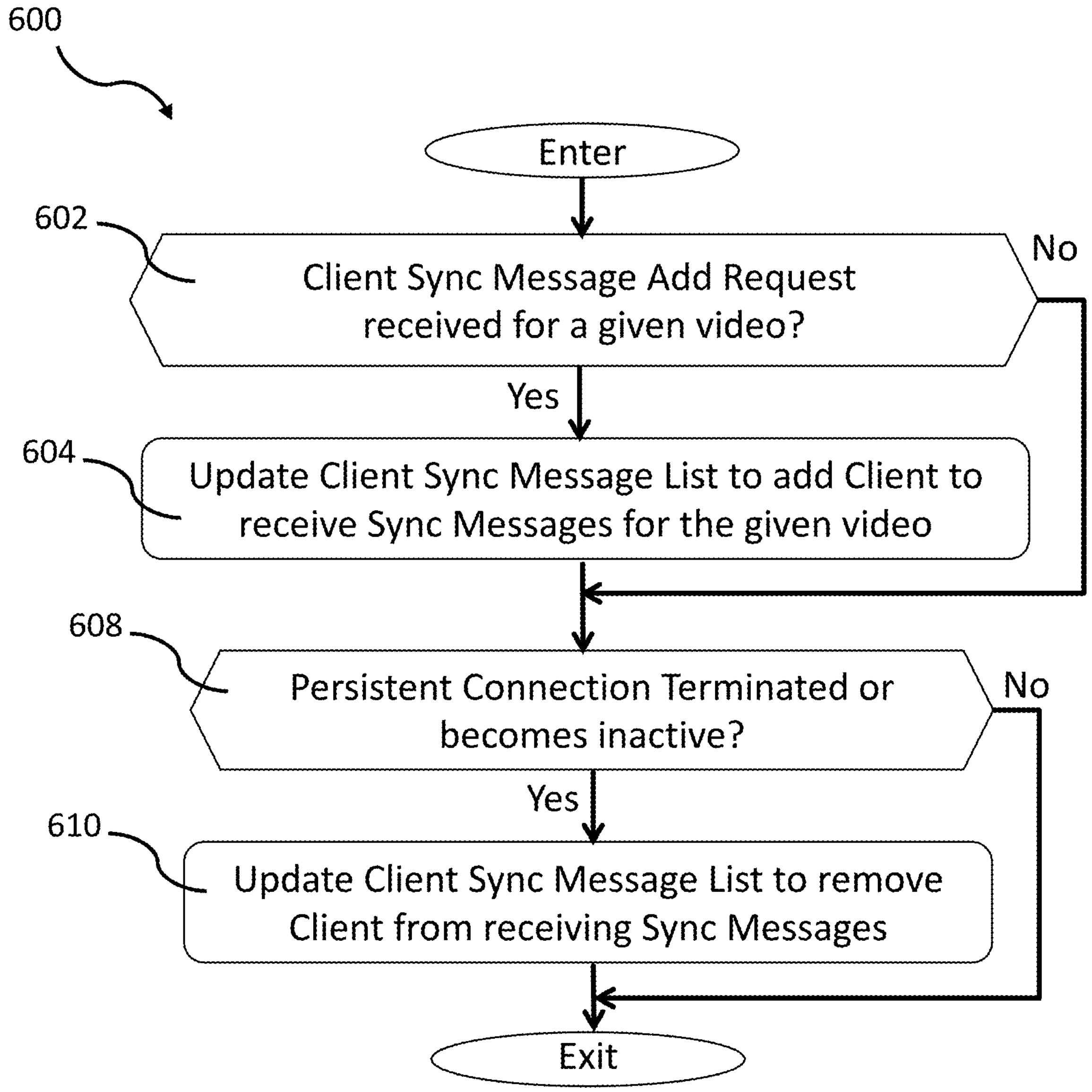
FIG. 6A is a flow diagram for receiving and managing "Client State" messages by a Synchronization Server, in accordance with embodiments of the present disclosure.

Referring to FIG. 6A, a flow diagram 600 illustrates one embodiment of a process or logic for implementing receiving and managing "Client State" messages by the Synchronization Server 50 including Sync Message Add requests, which may be referred to herein as Sync Message Add/Remove Logic. As discussed above, when one or more of the user devices 410-416 (FIG. 3B) desires to stream video and have external data be synchronized to that video, the respective client user device 410-416 opens a persistent connection with the synchronization server 50 and sends "Client State" messages to the Synchronization Server 50 which includes a Sync Message Add Request message 230 (first time through) over the persistent connection to the synchronization server 50 to add the client device to receive Sync Messages for a given video from the Synchronization Server 50. In particular, the process 600 begins at block 602, which determines whether a "Client State" Message having a Synch Message Add Request to add the client to receive Sync Messages for a given video, has been received over the persistent connection from a client/user device 34 (FIG. 1). If YES, block 604 updates the client Sync Message request list to add the requesting client to receive Sync Messages for the given video. The Client State message causes the synchronization server to start sending Sync Messages as they are generated. The details of the client/user device in the Client State message are added to the list of active persistent connections maintained by the synchronization server, and the synchronization server begins sending Sync Messages to this client user device for the airing (video) that the client user device is playing. Next, a box 608 determines whether the persistent connection has been terminated or become inactive. If YES, block 610 updates the client Sync Message list to remove the requesting client from receiving Sync Messages and the logic exits. When the persistent connection is terminated, either intentionally, e.g., when the user closes the browser tab or closes the client host app, or the user navigates to a new site, or unintentionally, e.g., when the network connection is lost due to poor network connectivity or other reasons, the synchronization server removes the persistent connection from its list of active persistent connections to send Sync Messages. If the result of block 608 is NO, the persistent connection is still active, and the logic exits.

Figure 6B:
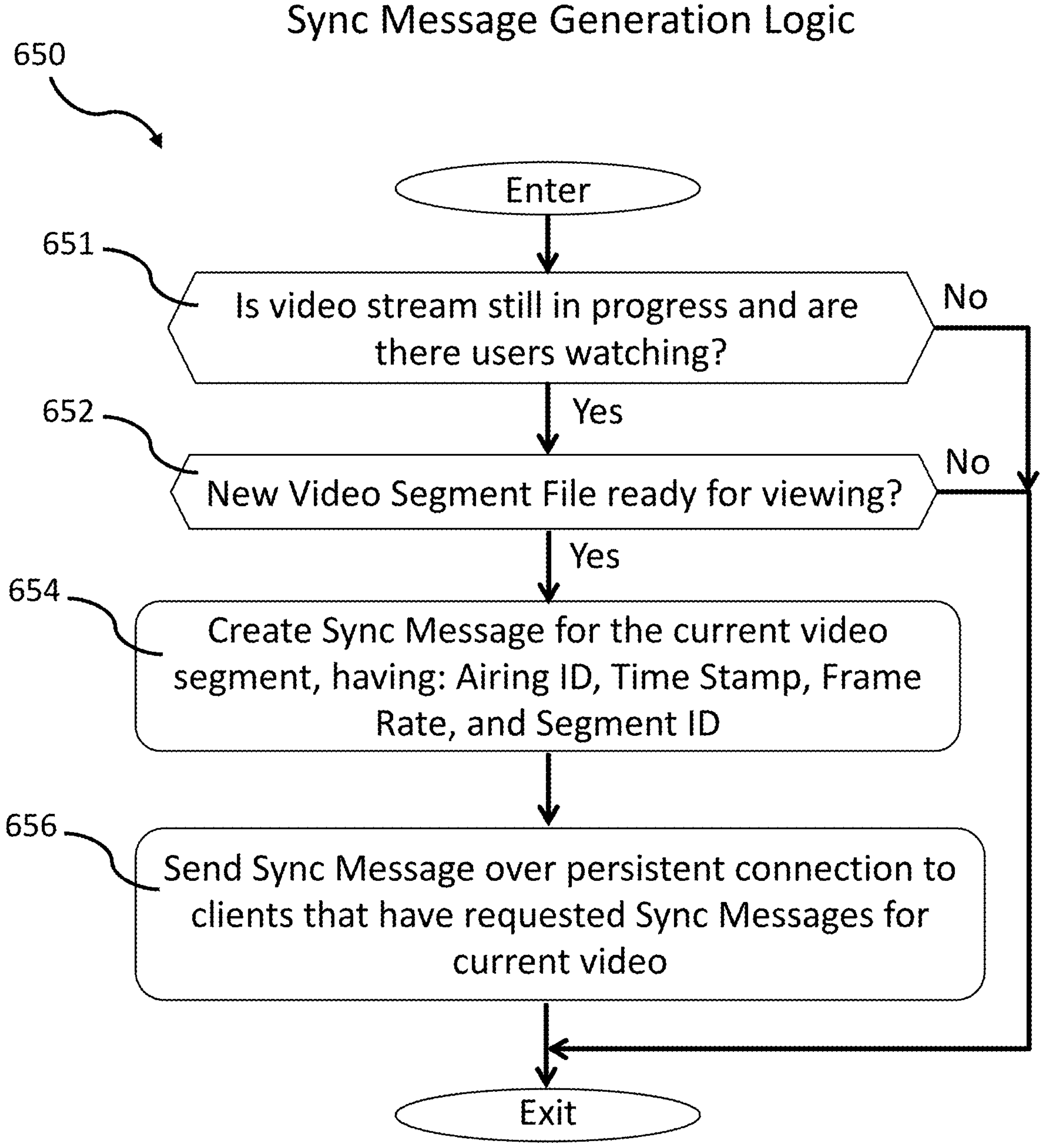
FIG. 6B is a flow diagram for Sync Message Generation Logic by a Synchronization Server, in accordance with embodiments of the present disclosure

Referring to FIG. 6B, a flow diagram 650 illustrates one embodiment of a process or logic for implementing Sync Message generation by the Synchronization Server 50, which may be referred to herein as Sync Message Generation Logic. In particular, the process 650 begins at block 651, which determines whether a given video stream is still in progress and whether there are any users watching the given video stream. If NO, the video stream has completed or there are no users watching it, so no Sync Messages need to be sent for this video stream, and the logic exits. If the result of block 651 is Yes, block 652 determines whether a new video segment file of a current video stream is ready for viewing by the client/user device 34 (FIG. 1). If YES, block 654 creates a Sync Message as discussed herein above with FIG. 3A. The Sync Message contains data needed by the client device to perform data synchronization with the current video being played by the client the Sync Message, such as: Airing ID (identifies the specific live feed event, airings or programs or streams), Timestamp (time close to the actual event recording wall clock time), FrameRate (video playback rate), Segment ID (identifies the video segment), as discussed herein above with FIG. 3A. Next, block 656 sends the Sync Message over the persistent connection to clients that have requested the Sync Messages for the current video. The Sync Messages are sent by the synchronization server one per video segment (i.e., once every two seconds for an HLS stream with two-second-long segments), at least a few seconds ahead of when the client user device will play the segment corresponding to the Sync Message. Next, or if the result of block 652 is NO, the logic exits.

Figure 7:
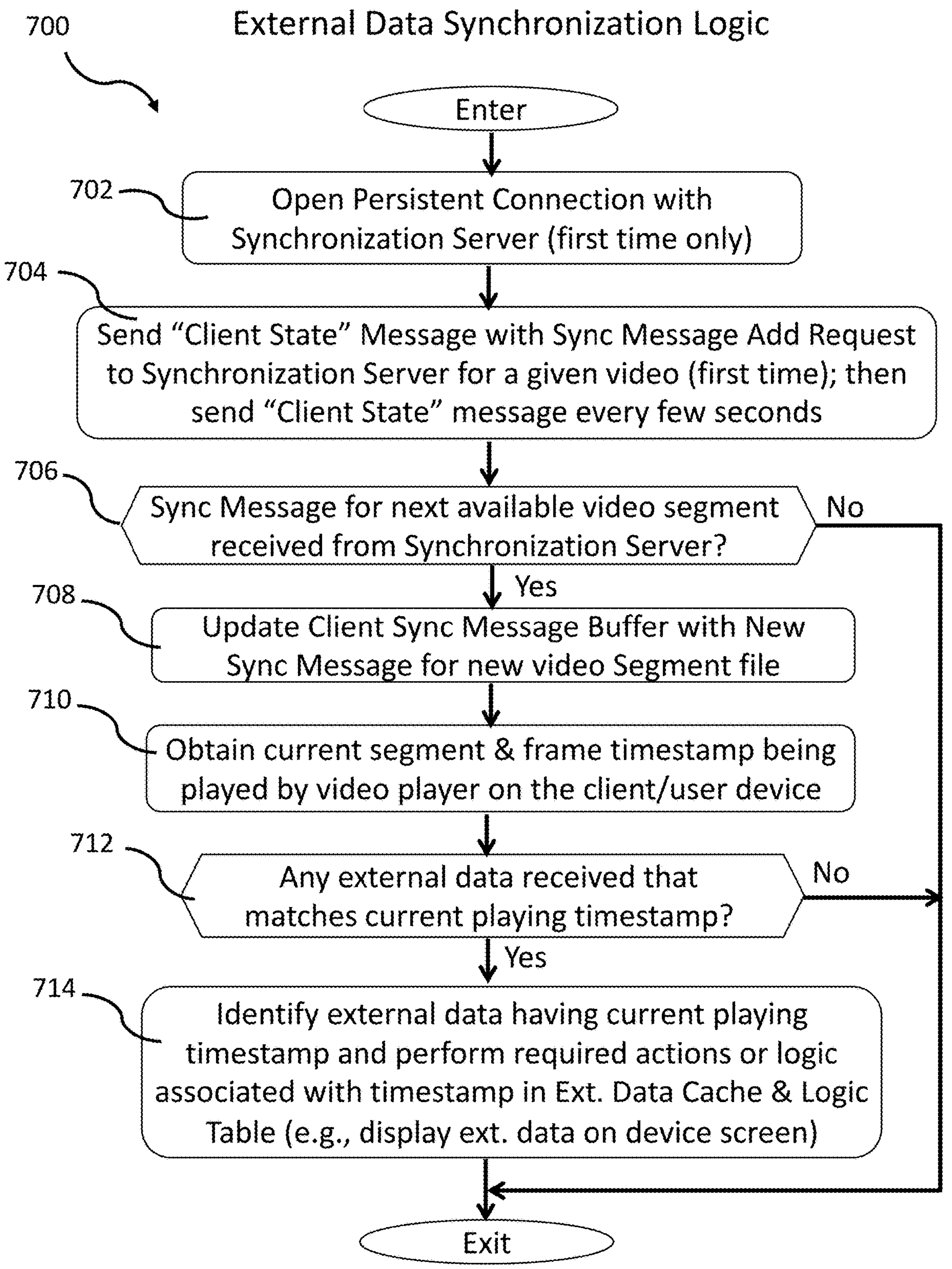
FIG. 7 is a flow diagram for receiving Sync Messages at the client device and synchronizing external data sources to the video being played, in accordance with embodiments of the present disclosure.
Figure 9:
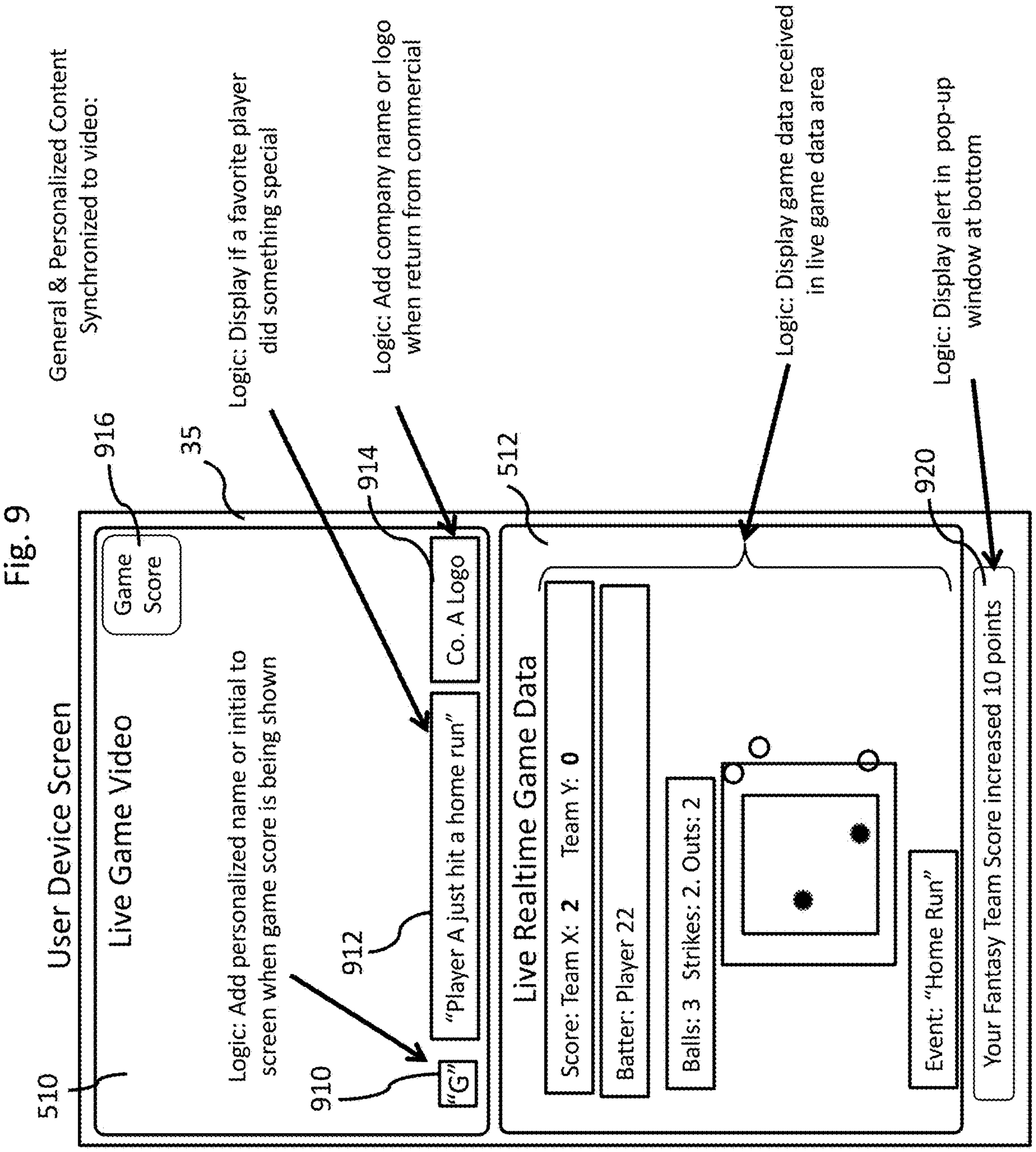
FIG. 9 is a block diagram showing general and personalized content added to the live video display synchronized to events shown in the video content, in accordance with embodiments of the present disclosure.

Referring to FIG. 7, a flow diagram 700 illustrates one embodiment of a process or logic for implementing receiving Sync Messages at the client/user device 34 (FIG. 1) and synchronizing external data sources to the video being played, which may be performed by the host app 37 on the user device 34. The process 700 begins at block 702, where the client host app opens a persistent connection to the synchronization server 50 when the client host app loads and leaves the persistent connection open, as discussed herein with FIG. 3B, so the client can send "Client State" messages to the synchronization server 50 (performed first time only). Next, block 704 sends a "Client State" Message with a Sync Message Add request for a given video to the synchronization server 50 indicating that this client is watching a particular video (or airing) and would like to receive Sync Messages (first time), then (after the first time) the client sends a "Client State" message to the synchronization server 50 every few seconds. In particular, when a video starts to play on the client user device, the client app (e.g., from user X) sends a "Client State" message over the persistent connection to the synchronization server 50 indicating that user X is watching video Y, along with other metadata about the current status of the client host app, such as client device type, user ID, authentication token (if applicable), or other user information, such as: "user <Joe>, airing <Team X v Y baseball game>, client type <iOS>". Other formats may be used for the client "State Messages" if desired. The initial client "State Message" for a given video stream causes the synchronization server to start sending Sync Messages as they are generated for each video segment of that video stream. The client host app continues to send the server Client State messages every few seconds to let the synchronization server 50 know that this particular user is still active and to update the synchronization server 50 if the user begins watching a different airing (or video) or makes another change that might affect what data the client needs. Next, a block 706 determines whether a Sync Message has been received from the synchronization server 50. If YES, block 708 updates the local client Sync Message buffer/queue/cache file for the new segment file. If the result of block 706 is NO, the process exits. After performing block 708, block 710 obtains the current segment and frame and timestamp for the video segment being played by video player on the client/user device. Next, block 712 determines if any external data events (e.g., Game Data, Video Data, Other Related Data), received by client matches the current playing timestamp. If the result of block 712 is NO, there are no external data events that match the current playing timestamp, so the process exits. If the result of block 712 is Yes, block 714 identifies any external data matching the current playing timestamp in the External Data Cache & Logic Table 460 (FIG. 4C) and performs any required actions or logic associated with the timestamp, such as display a particular phrase or graphic on the screen, as may be defined in the Ext. Data Cache & Logic Server Table 460 (examples of displaying content based on the logic/actions of the Table 460 are shown in FIG. 9), and then the logic exits. Thus, in some embodiments, each time a new segment begins playback on the client user device, the client host app finds the corresponding Sync Message and updates the client state with the server-provided timestamp for the first frame of that segment; and as each subsequent video frame is played, the "current timestamp" value is incremented accordingly. For example, for a 60 frames-per-second video, 16.667 milliseconds are added to the timestamp for every frame played. As each video frame is rendered to the display of the user device, the client host app checks for any external data with timestamps at or before the calculated "current timestamp" value; if any are found, the messages are moved from a "future messages" queue to a "current messages" queue and potentially displayed in some way, as defined by the active layout logic or external data logic/actions in the External Data Cache & Logic Table 460 (FIG. 4C) on the Other Video-Relate Data Server.

In some embodiments, instead of having a separate persistent connection for receiving the Sync Messages, the client host app may read (or extract) the timestamp of the first frame of the video segment directly from the received video stream itself. In that case, the client would read the timestamp embedded within the video stream using logic similar to that described with FIG. 6B (Sync Message Generation Logic) for the Synchronization Server. Also, in that case, there would not be a Sync Message generated or sent to the client, and the Sync Message Generation Logic 650 of FIG. 6B would not be performed. Further, the logic 700 of FIG. 7 would be adjusted such that the client would update a "Timestamp" buffer (or cache or queue) in block 708, which would hold the Timestamps of the video segments, instead of updating a Sync Message buffer, and the blocks 702-706 would not be performed. However, the blocks 710 to 714 in FIG. 7 relating to synchronizing the external data to the video stream being played would still be performed. Also, in that case, non-personalized external data related to the video being played, such as realtime game data (e.g., play-by-play data), video analysis data, or the like, may also be embedded in the video stream and read or extracted by the client app, if desired.

Figure 8:
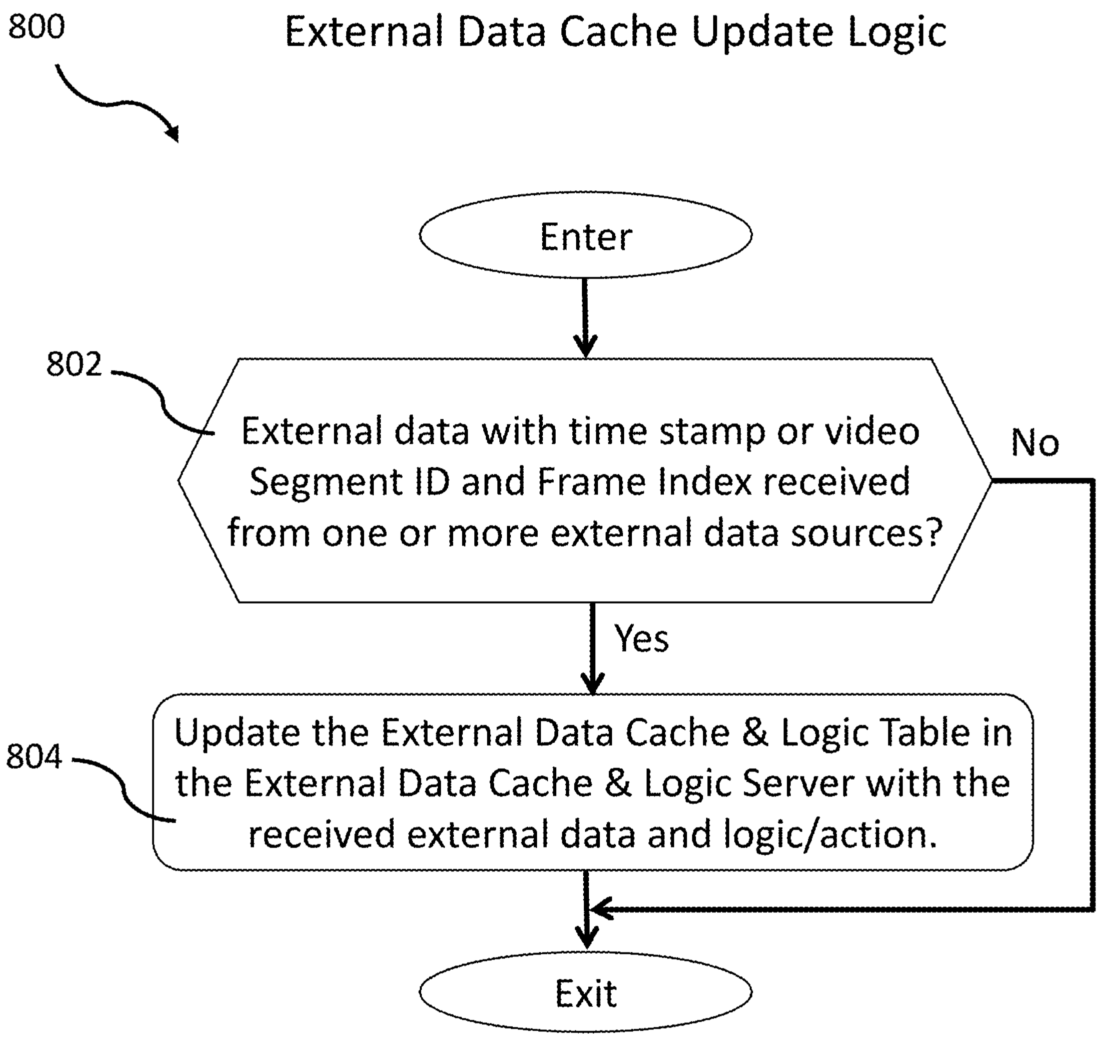
FIG. 8 is a flow diagram for receiving and storing external data from the external data sources, in accordance with embodiments of the present disclosure.

Referring to FIG. 8, a flow diagram 800 illustrates one embodiment of a process or logic for implementing receiving external data by the client/user device 34 (FIG. 1) and storing the external data received in the external data cache & logic table 460 (FIG. 4C) for use in synchronizing external data sources to the video being played, which may be performed on the host app 37 on the user device 34. As discussed herein, the client host app on the user device receives other types of messages having video-related data, such as Play-by-Play Messages (events within the current game), Fantasy Messages (updates related to the user's fantasy teams as a result of events within the current game), Sports Betting Messages (updates relating to sports wagers), or Social Media data (such as Twitter, Facebook, and the like); all of these other types of messages contain an event wall clock timestamp defining when they should be displayed in sync with a particular frame of video being played on the client user device. The process 800 begins at block 802, which determines if the user device has received external data having an event wall clock time stamp or video Segment ID and Frame Index from one or more external sources. If NO, the logic exits. If Yes, block 804 updates the external data cache & logic table 460 (FIG. 4C) with the latest external data received form the external data sources and selects the appropriate logic or action for the external data source, and the logic exits. The logic/action selected may be predetermined based on the type of data received. For example, a default logic for realtime game data may be to populate the realtime data screen portion of the display screen on the user device. Any desired logic or actions may be used and may depend on the specific data received, such as logic shown in FIG. 4C for event 494 for Video Data (VD Event 2) to display a sports company logo on screen when the video returns from a commercial.

Referring to FIG. 9, a screen illustration showing general and personalized content or external data added to the live game video 510 display and synchronized to events in the realtime live game data 512 is shown, which may be updated based on realtime live game data received from the game Data Server 46 as discussed herein. In particular, as discussed herein, the client external data synchronization logic in the host app may perform certain actions or logic, such at the logic/actions shown in the External Data Cache & Logic Table 460 (FIG. 4C), upon the occurrence of an event of interest to the user as determined by reviewing the received external data and any logic rules saved in the Other Related Data/Logic Server. For example, in some embodiments, the logic may add a user personalized name or initial (e.g., the initial "G") 910 to the live game video portion 510 of the display screen 35 when the game score 916 is shown on the live game video portion 510 of the screen 35. Also, in some embodiments, the logic may add a company logo (e.g., ESPN, or the like) 914 to the screen 35 when the live game is shown on the live game video portion 510 of the screen 35. Also, in some embodiments, the logic may add a statement 912 to the screen 35 if a user's favorite or followed player did something special in the game. Also, in some embodiments, the logic may display an alert pop-up window 920, which may provide other user-personalized content, such as realtime user specific Fantasy sports updates related to the game events in the video, or realtime user specific online betting updates related to the game events in the video, or social media alerts or feeds related to the game events in the video. Other general or personalized graphics or data may be added to the display using the data-video synchronization approach discussed herein.

Figure 10:
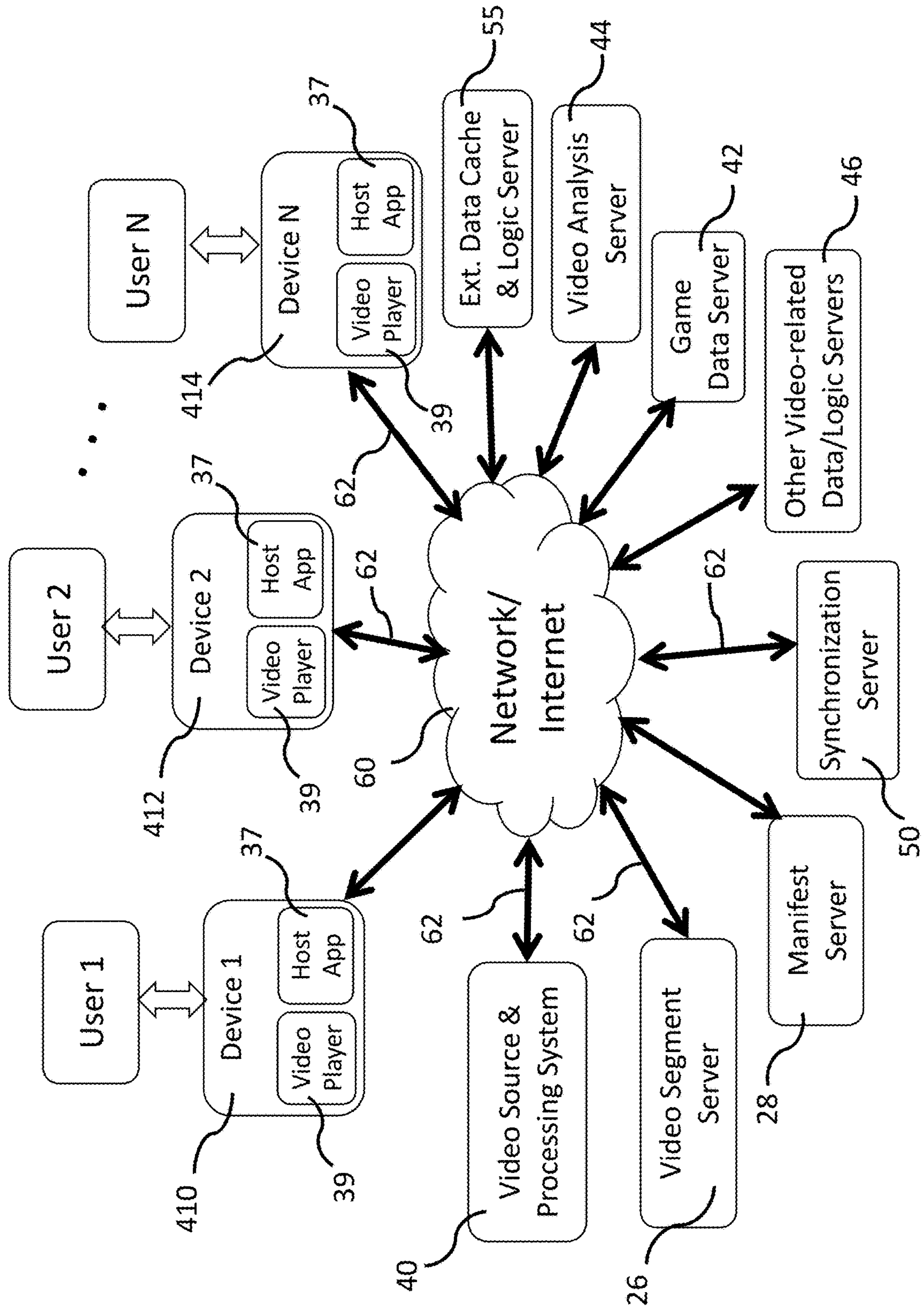
FIG. 10 is a block diagram of various components of a digital media streaming system connected via a network, in accordance with embodiments of the present disclosure

Referring to FIG. 10, the present disclosure may be implemented in a network environment. In particular, various components of an embodiment of the system of the present disclosure include a plurality of computer-based devices 410-414, which may interact with respective users (User 1 to User N). A given user may be associated with one or more of the devices 410-414. For example, a user may have a smartphone, a tablet, a smart TV, and a laptop, each of which may be playing a video desired to be viewed by the user at a given time. Each of the devices 410-414 may include a respective local (or host) operating system running on the computers of the respective devices 410-414. Each of the devices 410-414 may include a respective display screen that interacts with the operating system and any hardware or software applications, video and audio drivers, interfaces, and the like, needed to view and listen to the desired media content on the respective device. The users interact with the respective user devices 410-414 and may provide inputs to the devices 410-414 to start and stop the video at desired times and may input data content into the respective devices 410-414 to interact with the local device software applications.

Each of the user devices 410-414 may also include a local application software for playing the media content ("Host App") on the device, discussed herein, which runs on, and interacts with, the respective operating system of the device, and may also have a video player, discussed herein, which may also receive inputs from the users, and provides audio and video content to the respective audio speakers/headphones and visual displays of the devices. In some embodiments, portions of the Host App may reside on a remote server and communicate with the user device via the network.

Portions of the present disclosure may be implemented by adding software or logic to the user devices, such as adding to an existing host app or player application software or installing a new/additional host app or player application software, to perform the functions described herein, e.g., Sync Message request, opening persistent connection, and other functions described herein for the user devices 410-414. Similarly, other portions of the present disclosure may be implemented by software in the video source and processing system 40 or the video segment server 26, the manifest server 28, the distribution system 38, the synchronization server 50, the video analysis server 44, or the Ext. Data Cache & Logic Server 55, to perform the functions described herein associated with the server and video processing portion of the system, such as managing the client Sync Message list, sending Sync Messages, and the like.

The user devices 410-414, may be connected to or communicate with each other through a communications network 60, such as a local area network (LAN), wide area network (WAN), virtual private network (VPN), peer-to-peer network, or the internet, wired or wireless, as indicated by lines 62, by sending and receiving digital data over the communications network 60. If the devices 410-414 are connected via a local or private or secured network, the devices 410-414 may have a separate network connection to the internet for use by the device web browsers. The devices 410-414 may also each have a web browser to connect to or communicate with the internet to obtain desired content in a standard client-server based configuration to obtain the Host App, video player, or other needed files to execute the logic of the present disclosure. The devices may also have local digital storage located in the device itself (or connected directly thereto, such as an external USB connected hard drive, thumb drive or the like) for storing data, images, audio/video, documents, and the like, which may be accessed by the Host App and video player running on the user devices 410-414.

Also, the computer-based user devices 410-414 may also communicate with separate computer servers via the network 60 for the video segment server 26, the manifest server 28, the synchronization server 50, the game data server 46, the video analysis server 44, and the Ext. Data Cache & Logic Server 55. The servers described herein may be any type of computer server with the necessary software or hardware (including storage capability) for performing the functions described herein. Also, the servers described hereon (or the functions performed thereby) may be located in a separate server on the network 60, or may be located, in whole or in part, within one (or more) of the devices 410-414 on the network 60. In addition, the video source 12, encoder 16, and packager 20, shown collectively as numeral 40, may also communicate via the network 60 to the video segment server 26 and the manifest server 28 to provide the desired media content for use by the devices 410-414.

The system, computers, servers, devices and the like described herein have the necessary electronics, computer processing power, interfaces, memory, hardware, software, firmware, logic/state machines, databases, microprocessors, communication links, displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: tablets, laptop computers, desktop computers, smartphones, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method for synchronizing streaming media with external data sources received by a user device, the media being grouped into segment media files having media frames, comprising:
   establishing a connection between the user device and a server;
   receiving by the user device from the server via the connection, a sync message associated with the beginning of a media segment having media frames to be played by the user device, the sync message having an initial recording wall clock time stamp corresponding to a first frame of the media segment; and
   calculating, by the user device, a recording wall clock time for each frame in the segment using the initial recording wall clock time stamp and a frame rate for the segment.

2. The method of claim 1, further comprising:
   downloading to the user device, via a segment delivery connection between the user device and a segment server, separate from the connection, the segment file from the segment server, for playing on the user device;
   receiving by the user device external data having an event wall clock time, the external data for a given event wall clock time stamp being received by the user device before the segment having a corresponding time stamp; and
   displaying on the user device, the external data having the same wall clock time stamp as the wall clock time stamp of the frame being displayed, thereby providing realtime synchronized media and external data displayed on the user device.

3. The method of claim 1, wherein the frame rate is received from the sync message.

4. The method of claim 1, wherein the sync message further comprises at least one of: the frame rate for the media segment, a segment ID indicative of the segment, and an airing ID indicative of the event associated with the streaming media.

5. The method of claim 1, further comprising storing by the user device the external data and at least one of: an associated event wall clock time, an associated media segment ID, and an associated frame index number.

6. The method of claim 5, further comprising retrieving by the user device the stored external data when the event wall clock time associated with the segment and frame to be played next catches-up with the stored external data.

7. The method of claim 5, wherein the stored external data comprises at least one of: external data source identifier, time stamp, segment ID, frame index, external data content received, and external data logic/actions.

8. The method of claim 1, further comprising determining by the user device how to display the external data on the user device, based on external data logic.

9. The method of claim 1, wherein the establishing step comprises sending a sync message add request from the user device to the server to receive sync messages from the server.

10. The method of claim 1, wherein the sync message comprises information indicative of characteristics of the new segment file.

11. The method of claim 1, further comprising, after the displaying step, repeating all steps in the order shown, except for the establishing step, for each successive media segment file.

12. The method of claim 1, wherein the external data comprises at least one of: realtime event data, media data, and user-specific message data relating to the media being played.

13. The method of claim 1, wherein the connection comprises websockets.

14. The method of claim 1, wherein the sync message is sent by the server simultaneously to all user devices that have established the connection with the server.

15. The method of claim 1, further comprising receiving a manifest pointer from a manifest server indicative of the media segment file in the segment server.

16. The method of claim 15, further comprising requesting the manifest pointer by the user device from the manifest server.

17. The method of claim 15, further comprising updating a user device local manifest file with the manifest pointer from the manifest server, wherein at least a portion of the local manifest file is a copy of a source manifest file on the manifest server.

18. The method of claim 17, wherein the user device local manifest file comprises a top-level manifest file having pointers that point to at least one other manifest file having pointers indicative of the media segment file.

19. The method of claim 15, wherein the manifest pointer is indicative of at least one of: the location of the media segment file in the segment server and a second manifest file having information indicative of the media segment file.

20. The method of claim 1, wherein the media is live streaming media or pre-recorded media.

21. The method of claim 1, wherein the media segment file has a playing length of about 2 seconds, and the frame rate is about 60 frames/second.

22. The method of claim 1, wherein the media comprises at least one of audio and video.

23. A method for synchronizing media with external data sources on a user device, the media grouped into segment media files having media frames, comprising:
   establishing a connection between the user device and a server;
   receiving a sync message associated with the beginning of a media segment to be played by the user device, the sync message having at least an initial recording wall clock time stamp corresponding to a first frame of the media segment;
   determining by the user device, using the initial recording wall clock time stamp and a frame rate, a recording wall clock time for each media frame in the media segment;
   downloading the media segment file for playing on the user device;
   receiving by the user device, external data having an event wall clock time stamp; and
   synchronizing in realtime by the user device, the external data with the media segment file having the same time stamp.

24. The method of claim 23, wherein the sync message further comprises at least one of a segment ID indicative of the media segment and an airing ID indicative of the event associated with the streaming media.

25. The method of claim 23, further comprising storing by the user device the external data and at least one of: an associated event wall clock time, an associated media segment ID, and an associated media frame index number.

26. The method of claim 25, further comprising retrieving by the user device the stored external data when the event wall clock time associated with the media segment and media frame to be played next catches-up with the stored external data.

27. The method of claim 26, wherein the stored external data comprises at least one of: external data source identifier, time stamp, segment ID, frame index, external data content received, and external data logic/actions.

28. The method of claim 23, further comprising determining by the user device how to display the external data on the user device, based on external data logic.

29. The method of claim 23, wherein the establishing step comprises sending a sync message add request from the user device to the server to receive sync messages from the server.

30. The method of claim 23, wherein the sync message comprises information indicative of characteristics of the new segment file.

31. The method of claim 23, further comprising, after the synchronizing step, repeating all steps in the order shown, except for the establishing step, for each successive media segment file.

32. The method of claim 23, wherein the connection comprises websockets.

33. The method of claim 23, wherein the sync message is sent by the server simultaneously to all user devices that have established the connection with the server.

34. The method of claim 23, further comprising receiving a manifest pointer from a manifest server indicative of the media segment file in the segment server.

35. The method of claim 23, wherein the media is live streaming media or pre-recorded media.

36. The method of claim 23, wherein the media comprises at least one of audio and video.

37. A method for synchronizing media with external data sources, comprising:

receiving by a user device streaming encoded media content grouped into segment media files, each segment media file having a plurality of media frames and having an initial recording wall clock time stamp corresponding to a first frame of the media segment;

downloading to the user device, via a segment delivery connection between the user device and a segment server, a media segment file from the segment server, for playing on the user device;

extracting from the media segment file the initial recording wall clock time stamp of the media segment;

calculating, by the user device, a recording wall clock time for each frame in the media segment using the initial recording wall clock time stamp and a frame rate for the media segment;

receiving by the user device external data having an event wall clock time, the external data for a given event wall clock time stamp being received by the user device before the media segment having a corresponding time stamp; and displaying on the user device, the external data having the same wall clock time stamp as the wall clock time stamp of the media frame being displayed, thereby providing realtime synchronized media and external data displayed on the user device.

38. The method of claim 37, wherein the media comprises at least one of audio and video.

* * * * *